United States Patent
Goto et al.

(10) Patent No.: US 9,681,012 B2
(45) Date of Patent: Jun. 13, 2017

(54) COLOUR MEASUREMENT DEVICE AND COLOUR MEASUREMENT METHOD

(71) Applicant: Konica Minolta, Inc., Tokyo (JP)

(72) Inventors: Yasushi Goto, Osaka (JP); Yoshiroh Nagai, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/309,105

(22) PCT Filed: Apr. 23, 2015

(86) PCT No.: PCT/JP2015/062434
§ 371 (c)(1),
(2) Date: Nov. 4, 2016

(87) PCT Pub. No.: WO2015/170603
PCT Pub. Date: Nov. 12, 2015

(65) Prior Publication Data
US 2017/0078505 A1    Mar. 16, 2017

(30) Foreign Application Priority Data
May 7, 2014  (JP) .................................. 2014-096099

(51) Int. Cl.
*G01J 3/46* (2006.01)
*H04N 1/00* (2006.01)
*G01J 3/52* (2006.01)

(52) U.S. Cl.
CPC ............ *H04N 1/00702* (2013.01); *G01J 3/52* (2013.01); *G01J 3/524* (2013.01); *H04N 1/00015* (2013.01); *H04N 1/00023* (2013.01); *H04N 1/00034* (2013.01); *H04N 1/00045* (2013.01); *H04N 1/00087* (2013.01);
(Continued)

(58) Field of Classification Search
CPC ...... H04N 1/00; G01J 3/52; G01J 3/46; G01J 3/50; G01J 3/51; G01J 3/02
See application file for complete search history.

(56) References Cited

U.S. PATENT DOCUMENTS

| | | | |
|---|---|---|---|
| 6,765,674 B2 | 7/2004 | Orelli et al. | |
| 2014/0255046 A1* | 9/2014 | Takemura | G03G 15/5062 399/15 |

OTHER PUBLICATIONS

International Search Report issued in PCT/JP2015/062434, mailed Jul. 28, 2015 (2 pages).
(Continued)

*Primary Examiner* — Abdullahi Nur
(74) *Attorney, Agent, or Firm* — Osha Liang LLP

(57) ABSTRACT

A color measurement device acquires an image of a relative position calibration chart. The relative position calibration chart includes a calibration figure having a given calibration feature that has a position that is detectable along at least one of a first and a second direction. A color measurement of the relative position calibration chart is performed. Relative position relationship-related information is derived based on the calibration feature in the image of the relative position calibration chart and the calibration feature in the color measurement of the relative position calibration chart. A color of each patch of a number of patches of a color chart is measured at a position corresponding to one of the patches while correcting the position of the patch based on the position relationship-related information.

9 Claims, 18 Drawing Sheets

(52) U.S. Cl.
CPC ..... *H04N 1/00734* (2013.01); *H04N 1/00748* (2013.01); *H04N 1/00779* (2013.01); *H04N 2201/0082* (2013.01)

(56) References Cited

OTHER PUBLICATIONS

Written Opinion of the International Searching Authority issued in PCT/JP2015/062434, mailed Jul. 28, 2015 (3 pages).

\* cited by examiner

FIG.13A
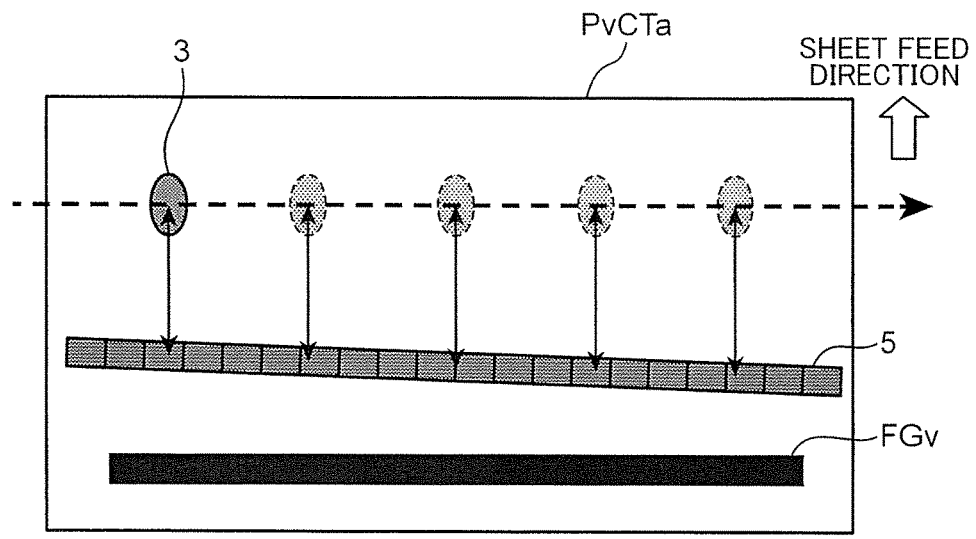
FIG.13B                    FIG.13C
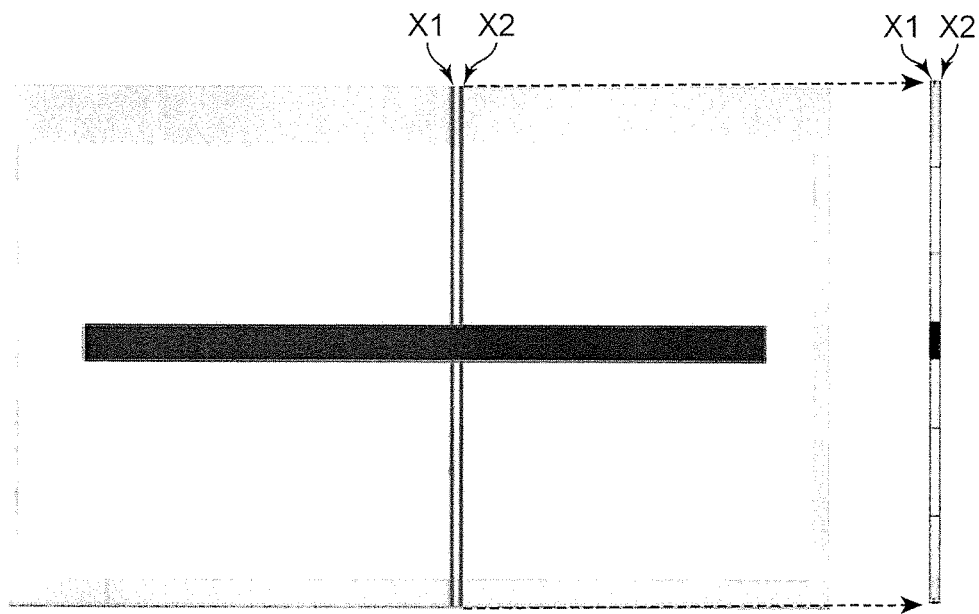

horCIS(m)

m horColor m

EDGE LINES (—), INTERMEDIATE LINES (···)
AND PATCH CENTER POSITION (○)

Colour Measurement Device and Colour Measurement Method

TECHNICAL FIELD

The present invention relates to a color (colour) measurement device and method for measuring a color, and more particularly to a color measurement device and method capable of measuring a color at a proper position automatically.

BACKGROUND

In a company specializing in creating color printed materials, such as a printing company, in order to maintain quality of printed materials, colors of a printed material are measured to adjust colors of a printing unit which has printed the printed material, on a regular basis. In such color adjustment for a printing unit, as one example, original image data, called "color chart", is printed by the printing unit, and respective colors of a plurality of patches of the printed color chart are measured by a color measurement device. Then, an amount of color deviation between an actual measured value and a target value of a color of each patch is evaluated, and, according to a result of the evaluation, colors of the printing unit are adjusted.

The color chart is constructed such that it comprises a plurality of color samples, called "patches", as mentioned above, wherein each of the patches are formed differently in terms of color (hue, brightness (luminosity), chroma (colorfulness, saturation)), and arranged in a given manner. Such a color chart includes various types. For example, there is one type of color chart constructed such that a plurality of quadrangular-shaped patches having various colors are arranged in horizontal and vertical directions in a two-dimensional array configuration. In this type of color chart, depending on intended contents of the evaluation, there are various patterns, such as a pattern in which the patches are arranged to form a random (arbitrary) color array, and a pattern in which the patches are arranged such that a change in shade between adjacent ones of the patches becomes smaller, like a gradation. This type of color chart includes not only a color chart which is created by a user using a color chart creation tool provided from a manufacturer of color measurement devices, but also a color chart which is provided from a public agency. As above, a color chart can have a significantly wide variety of patterns by differences in shape, arrangement, color combination and others of the patches.

Meanwhile, the number of colors for use in color adjustment for a printing unit has been increasing year after year. Accordingly, the number of patches arranged in a color chart has also been increasing, wherein a size (area) of each patch is relatively small.

From such a circumstance, it has become practically impossible to manually accurately adjust a position of a measuring section of a color measurement device with respect to each patch, so as to perform a color measurement. For this reason, there is a need for an automatic system for automatically measuring a position of each patch, and automatically adjusting a position of the measuring section of the color measurement device to become coincident with the measured position of the patch, so as to measure a color of the patch. As one example of this system, Gretag-Macbeth AG proposed a method which comprises: taking a two-dimensional color image of a color chart to be measured; calculating a position of each patch by an image processing technique using a computer; and moving a color measuring head to the determined position of the patch so as to measure colors of the color chart, as described in the following Patent Literature 1.

In this regard, for deriving a position of each patch by the above image processing, there is a need for an imaging unit such as a camera for taking an image of a color chart, in addition to a color measuring unit such as a colorimeter for measuring a color of each patch of the color chart. The imaging unit and the color measuring unit are separate units, and thereby arranged at separate positions, individually. Thus, for moving the color measuring unit to a position of each patch derived based on the image of the color chart obtained by the imaging unit, there is a need for information about a relative position relationship between the imaging unit and the color measuring unit.

As for this information about the relative position relationship, it is conceivable to preliminarily store it in a color measurement device, based on design values of the color measurement device. However, in an actual device, there are an installation error and a dimensional accuracy error in each of the imaging unit and the color measuring unit. Thus, the use of design values is likely to lead to a situation where the color measuring unit cannot be always moved to a position of each patch derived based on the image of the color chart obtained by the imaging unit. Moreover, when a target one of the patches to be measured is adjusted to be positioned at the color measuring unit while feeding the color chart by a conveyance unit such as a conveyance roller, slip occurring between the color chart and the conveyance roller is likely to lead to a situation where the color measuring unit cannot be moved to a position of each patch derived based on the image of the color chart obtained by the imaging unit.

CITATION LIST

Patent Literature

Patent Literature 1: U.S. Pat. No. 6,765,674 B

SUMMARY OF INVENTION

One or more embodiments of the invention provide a color measurement device and method capable of actually measuring information about a relative position relationship between an imaging unit and a color measuring unit, to thereby measure a color of each patch at a more proper position.

In a color measurement device and method, an image of a relative position calibration chart is acquired by an imaging unit, wherein the relative position calibration chart is marked with a calibration figure having a given calibration feature whose position is detectable along at least one of mutually orthogonal first and second directions, and the relative position calibration chart is subjected to color measurement by a color measuring unit, whereby information about the relative position relationship is derived based on the calibration feature in the image of the relative position calibration chart acquired by the imaging unit, and the calibration feature in a result of the color measurement of the relative position calibration chart obtained by the color measuring unit. Then, when a color of each of a plurality of patches of a color chart is measured by the color measuring unit at a position of a corresponding one of the patches derived from an image of the color chart, the color of each patch is measured while correcting the position of each patch according to information about the relative position relationship. Thus, the color measurement device and method makes it possible to actually measure information about the relative position relationship between the imaging unit and the color measuring unit to thereby measure a color of each patch at a more proper position.

These and other objects, features, and advantages of one or more embodiments of the present invention will become apparent upon reading of the following detailed description along with the accompanying drawings.

BRIEF DESCRIPTION OF DRAWINGS

FIG. 13A is a diagram depicting a state of the actual measurement of the second information about the relative position relationship between the imaging unit and the color measuring unit in the sub scanning direction.

FIG. 13B is an example of an image based on respective pieces of data obtained by the imaging unit and the color measuring unit.

FIG. 13C is an example of a second image based on respective pieces of data obtained by the imaging unit and the color measuring unit.

DESCRIPTION OF EMBODIMENTS

Based on the drawings, embodiments of the present invention will now be described. It should be noted that elements or components assigned with the same reference sign in the figures means that they are identical, and therefore duplicated description thereof will be omitted appropriately. In this specification, for a generic term, a reference sign without any suffix is assigned thereto, and, for a term meaning an individual element or component, a reference sign with a suffix is assigned thereto.

Figure 1:
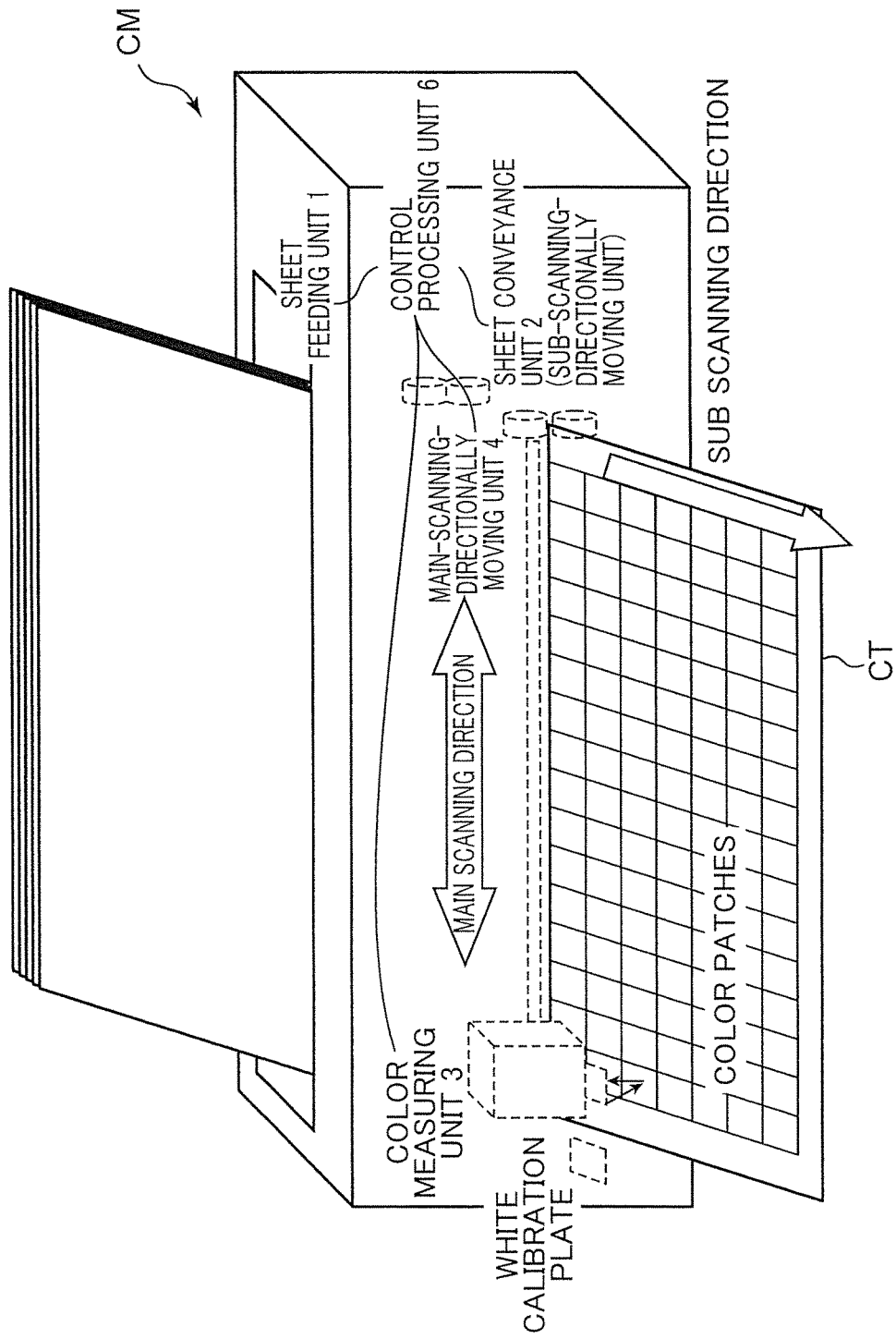
FIG. 1 is a perspective view depicting a schematic configuration of a color measurement device in accordance with one or more embodiments.
Figure 2:
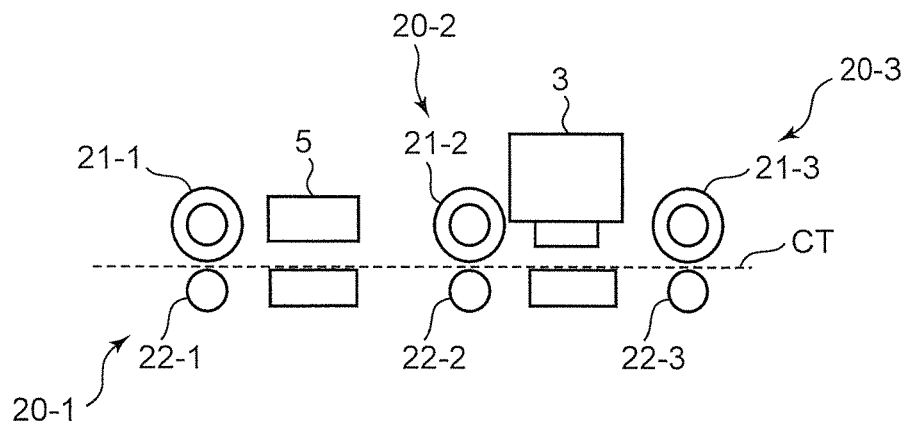
FIG. 2 is a schematic side view depicting an arrangement relationship between an imaging unit and a color measuring unit in the color measurement device in accordance with one or more embodiments.
Figure 3:
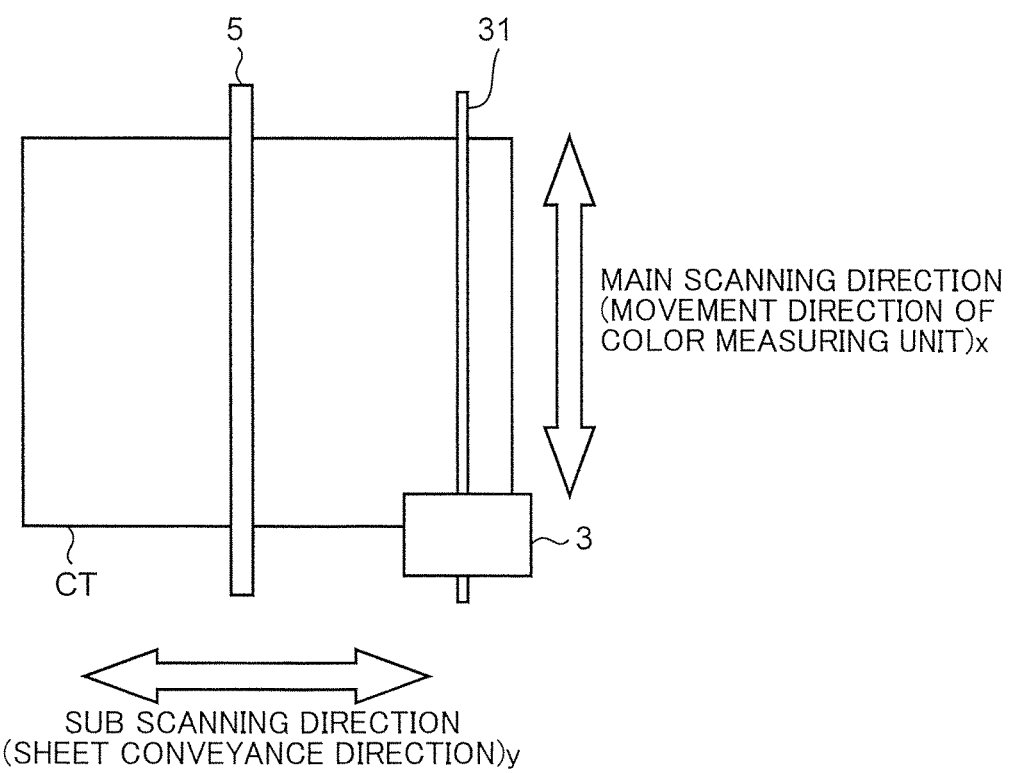
FIG. 3 is a schematic top view depicting the arrangement relationship between the imaging unit and the color measuring unit in the color measurement device in accordance with one or more embodiments.
Figure 4:
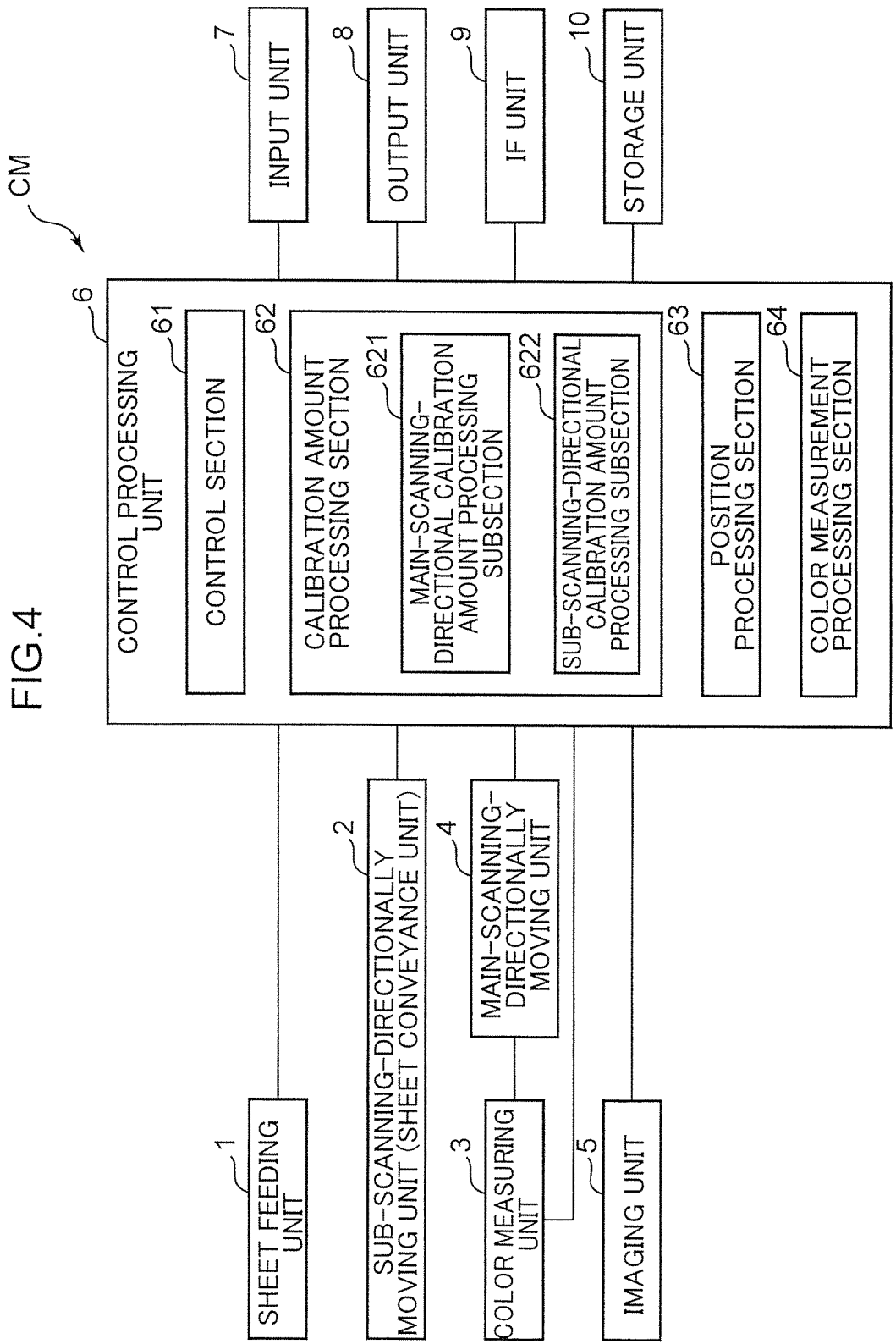
FIG. 4 is a block diagram depicting an electrical configuration of the color measurement device in accordance with one or more embodiments.

FIG. 1 is a perspective view depicting a schematic configuration of a color measurement device in accordance with one or more embodiments. FIG. 2 is a schematic side view depicting an arrangement relationship between an imaging unit and a color measuring unit in the color measurement device in accordance with one or more embodiments. FIG. 3 is a schematic top view depicting the arrangement relationship between the imaging unit and the color measuring unit in the color measurement device in accordance with one or more embodiments. FIG. 4 is a block diagram depicting an electrical configuration of the color measurement device in accordance with one or more embodiments.

The color measurement device CM in accordance with one or more embodiments is a device for measuring a color (hue, brightness (luminosity), chroma (colorfulness, saturation)) of a measurement target. For example, it includes a sheet feeding unit 1, a sub-scanning-directionally moving unit (sheet conveyance unit) 2, a color measuring unit 3, a main-scanning-directionally moving unit 4, an imaging unit 5, a control processing unit 6, an input unit 7, an output unit 8, an interface unit (IF unit) 9, and a storage unit 10, as depicted in FIGS. 1 to 4.

The sheet feeding unit 1 is a sheet conveying mechanism which is connected to the control processing unit 6 and is operable, according to control of the control processing unit 6, to introduce a measurement target sheet set in the color measurement device CM, into an inside of the color measurement device CM. The measurement target sheet may be any type. For example, in case of adjusting colors of a printing unit, it is a color chart CT having a plurality of patches each of which is a region of a given color. On the other hand, in case of deriving information about a relative position relationship between the color measuring unit 3 and the imaging unit 5, it is a relative position calibration chart PCT marked with a calibration figure having a given calibration feature. For example, the sheet feeding unit 1 includes: a reservoir section capable of reserving a measurement target sheet; an introduction section capable of picking up the measurement target sheet reserved in the reservoir section and introducing the measurement target sheet into the inside of the color measurement device CM, wherein it is constructed, for example, such that it includes a pick-up roller; and a delivery section capable of delivering the measurement target sheet introduced by the introduction section, to the sub-scanning-directionally moving unit 2, wherein it is constructed, for example, such that it includes a conveyance roller.

The sub-scanning-directionally moving unit (sheet conveyance unit) 2 is a sheet conveyance mechanism which is connected to the control processing unit 6 and is operable, according to control of the control processing unit 6, to convey the measurement target sheet delivered from the sheet feeding unit 1, in a sub scanning direction (second direction) orthogonal to a first direction preliminarily set as a main scanning direction, in increments of a given amount (distance) according to a unitary conveyance instruction (second unitary conveyance instruction). The sub-scanning-directionally moving unit 2 is constructed such that it can convey a measurement target sheet along the sub scanning direction, in two modes: forward feeding; and backward feeding. For example, the forward feeding means conveying a measurement target sheet from an upstream side (the side of the sheet feeding unit 1) toward a downstream side (discharge side), and the backward feeding means conveying a measurement target sheet in a direction opposite to a direction of the forward feeding, i.e., from the downstream side toward the upstream side. The sub-scanning-directionally moving unit 2 is constructed, for example, such that it comprises a plurality of sheet conveyance roller assemblies, and a drive section capable of rotationally driving the sheet conveyance roller assemblies. Each of the sheet conveyance roller assemblies is constructed such that it includes a drive roller capable of being rotationally driven by the drive section, and a driven roller capable of being rotationally driven according to rotational driving of the drive roller. For example, the drive section is constructed such that it includes a stepping motor (sub-scanning stepping motor). In the sub-scanning-directionally moving unit 2 constructed as above, in response to an input of one drive pulse (second drive pulse; one example of the second unitary conveyance instruction), the sub-scanning stepping motor is rotated by a given angle (second primary angle), and, according to the rotation of the sub-scanning stepping motor, the drive roller is rotated by a given angle (second secondary angle). Then, according to the rotation of the drive roller, a measurement target sheet is conveyed (moved) along the sub scanning direction by a given amount (distance). More specifically, in the example depicted in FIG. 2, the sub-scanning-directionally moving unit 2 includes three, first to third, sheet conveyance roller assemblies 20-1 to 20-3. The first to third sheet conveyance roller assemblies 20-1 to 20-3 are arranged from the upstream side toward the downstream side along the sub scanning direction. Each of the first to third sheet conveyance roller assemblies 20-1 to 20-3 comprises a corresponding one of first to third drive rollers 21-1 to 21-3 and a corresponding one of first to third driven rollers 22-1 to 22-3. Each of the first to third drive rollers 21-1 to 21-3 can be rotated by a corresponding one of non-depicted first to third stepping motors rotated in synchronization with each other. In the forward feeding, a measurement target sheet delivered from the sheet feeding unit 1 is nipped between a pair of the first drive roller 21-1 and the first driven roller 22-1, and the first drive roller 21-1 is rotationally driven in a normal rotation direction (e.g., clockwise direction) by the drive section, so that the measurement target sheet is conveyed from the first sheet conveyance roller assembly 20-1 to the second sheet conveyance roller assembly 20-2. The measurement target sheet conveyed to the second sheet conveyance roller assembly 20-2 is conveyed from the second sheet conveyance roller assembly 20-2 to the third sheet conveyance roller assembly 20-3 by the second sheet conveyance roller assembly 20-2, in the same manner as above. Then, the measurement target sheet conveyed to the third sheet conveyance roller assembly 20-3 is conveyed from the third sheet conveyance roller assembly 20-3 to the downstream side by the third sheet conveyance roller assembly 20-3, in the same manner as above. In the backward feeding, each of the first to third drive rollers 21-1 to 21-3 are rotationally driven in a reverse direction (in the above example, counterclockwise direction) by the drive section, in an opposite way with respect to the forward feeding mode, so that the measurement target sheet is conveyed from the downstream side toward the upstream side.

The following description will be made on the assumption that the main scanning direction (first direction) is defined as an x-direction (horizontal direction), wherein a coordinate axis set along the x-direction is defined as an x-axis, and the sub scanning direction (second direction) is defined as a y-direction (vertical direction), wherein a coordinate axis set along the y-direction is defined as a y-axis. These tennis will hereinafter be used appropriately.

The color measuring unit 3 is a device which is connected to the control processing unit 6 and is operable, according to control of the control processing unit 6, to measure a color of a measurement target. For example, the color measuring unit 3 may be a color measurement sensor capable of acquiring given optical information about a measurement target so as to derive a color of the measurement target. In one example, the color measuring unit 3 is a spectrophotometric colorimeter which is equipped with a spectroscopic optical element and a photoelectric conversion element for measuring a reflectance (or transmittance) at each wavelength, and is operable to measure a color of an object based on the reflectance (or transmittance) at each wavelength. In another example, the color measuring unit 3 is a tristimulus value-type colorimeter which is equipped with an optical filter and a photoelectric conversion element for measuring tristimulus values of R, G and B components, and is operable to measure a color of an object based on a color difference between the tristimulus values. The color measuring unit 3 can be calibrated by a white calibration, i.e., by measuring a so-called white calibration plate (reference white plate) capable of reflecting wavelengths in a measurement range at a high reflectance (e.g., about 90% to about 99%).

The main-scanning-directionally moving unit 4 is a moving mechanism which is connected to the control processing unit 6 and is operable, according to control of the control processing unit 6, to move the color measuring unit 3 in the main scanning direction (first direction), in increments of a given amount (distance) according to a given unitary conveyance instruction (first unitary conveyance instruction). The main-scanning-directionally moving unit 4 is constructed, for example, such that it includes: a guide member for guiding the color measuring unit 3; a feed mechanism, such as a rack and pinion assembly (rack-and-pinion) or a feed screw, capable of moving the color measuring unit 3 while being guided by the guide member; and a feed mechanism drive section, such as a stepping motor (main-scanning stepping motor), capable of driving the feed mechanism. In one example, as depicted in FIG. 3, the main-scanning-directionally moving unit 4 is equipped with a rack 31 prepared by cutting teeth on a flat plate-shaped rod and disposed to extend along the main scanning direction, and a pinion (not depicted) provided in the color measuring unit 3 and capable of being rotationally driven, for example, by the main-scanning stepping motor, wherein the pinion and the rack 31 are brought into mesh engagement with each other. In the main-scanning-directionally moving unit 4 constructed as above, in response to an input of one drive pulse (first drive pulse; one example of the first unitary conveyance instruction), the main-scanning stepping motor is rotated by a given angle (first primary angle), and, according to the rotation of the main-scanning stepping motor, the pinion is rotated by a given angle (first secondary angle). Then, according to the rotation of the pinion, the color measuring unit 3 is moved along the rack 31 in the main scanning direction by a given amount (distance).

The imaging unit 5 is a device which is connected to the control processing unit 6 and is capable of taking an optical image of an object, according to control of the control processing unit 6. The imaging unit 5 is constructed, for example, such that it comprises a line sensor (linear image sensor) having a plurality of photoelectric conversion elements arranged along one direction. As depicted in FIG. 3, it is disposed to extend, along the main scanning direction (x-direction), i.e., in a state in which the one direction as an arrangement direction of the plurality of photoelectric conversion elements is coincident with the main scanning direction (x-direction). In the color measurement device CM in accordance with one or more embodiments, the imaging unit 5 comprises the line sensor, so that it is not necessary to take into account a problem occurring, for example, in case of using an area sensor comprising an imaging optical system, i.e., distortion of a peripheral region of an image due to the imaging optical system.

As depicted in FIG. 2, the imaging unit 5 is disposed between the first sheet conveyance roller assembly 20-1 and the second sheet conveyance roller assembly 20-2, and the color measuring unit 3 and the main-scanning-directionally moving unit 4 are disposed to allow the color measuring unit 3 to be moved between the second sheet conveyance roller assembly 20-2 and the third sheet conveyance roller assembly 20-3, along the main scanning direction. The imaging unit 5 is operable to image a measurement target sheet with respect to each line along the main scanning direction (x-direction), in a state in which the measurement target sheet is being conveyed in the sub scanning direction (y-direction) by the sub-scanning-directionally moving unit 2, to thereby generate an image (image data) of the measurement target sheet. A relative position y between a measurement target sheet and the color measuring unit 3 in the sub scanning direction can be changed by conveying the measurement target sheet in the sub scanning direction (y-direction) by the sub-scanning-directionally moving unit 2, and a relative position x between the measurement target sheet and the color measuring unit 3 in the main scanning direction can be changed by moving the color measuring unit 3 itself in the main scanning direction (x-direction) by the main-scanning-directionally moving unit 4. In this way, the color measuring unit 3 can be moved to an arbitrary position (x, y) on the measurement target sheet to measure a color at the position (x, y).

The input unit 7 is a device which is connected to the control processing unit 6 and is capable of allowing various commands such as a command directing a color measurement of a measurement target, and various data, such as an identifier of a measurement target, necessary for a color measurement, to be input into the color measurement device CM therethrough. For example, it may be a plurality of input switches each assigned with a given function. The output unit 8 is a device which is connected to the control processing unit 6 and is operable, according to control of the control processing unit 6, to output the command and data input through the input unit 7, and a color of a measurement target measured by the color measurement device CM. For example, it may be a display unit such as a CRT display, an LCD or an organic EL display, or a printing unit such as printer.

The input unit 7 and the output unit 8 may be constructed as a touch panel. In the case of constructing such a touch panel, the input unit 7 is a position input unit, such as a resistive type or a capacitive type, operable to detect and accept an operated position, and the output unit 8 is be a display unit. In this touch panel, the position input unit is provided on a display surface of the display unit. When one or more candidates for input content inputtable into the display unit are displayed on the display unit, and a user touches a position of the display surface at which an input content the user wants to input is displayed, the touched position is detected by the position input unit, and the content displayed at the detected position is input into the color measurement device CM, as an input content operated by the user. Such a touch panel allows a user to intuitively understand an input operation, so that it is possible to provide a color measurement device CM which is easy to handle for a user.

The IF unit 9 is a circuit which is connected to the control processing unit 6 and is operable, according to control of the control processing unit 6, to perform input and output of data with respect to an external device. For example, it is may be:

an interface circuit conforming to the serial communication standard RS-232C; an interface circuit conforming to the Bluetooth (trademark) standard; an interface circuit for infrared communication conforming to the IrDA (Infrared Data Association) standard or the like; and an interface circuit conforming to the USB (Universal Serial Bus) standard.

The storage unit 10 is a circuit which is connected to the control processing unit 6 and is operable, according to control of the control processing unit 6, to store therein various given programs and various given data. Examples of the various given programs include a control processing program such as: a color measurement program for measuring a color of a measurement target; a position measurement program for, in the case where the measurement target is a color chart CT, deriving a position of each patch of the color chart CT; and a relative position measurement program for deriving the information about the relative position relationship between the color measuring unit 3 and the imaging unit 5 (relative position relationship-related information). Examples of the various given data include a backlash amount derived by the control processing unit 6 in an aftermentioned manner. For example, the storage unit 10 includes: an ROM (Read Only Memory) as a non-volatile storage element, and an EEPROM (Electrically Erasable Programmable Read Only Memory) as a rewritable non-volatile storage element. The storage unit 10 also includes an RAM (Random Access Memory) capable of storing data generated during execution of the given program, or the like, to serve as a so-called "working memory" for the control processing unit 6.

The control processing unit 6 is a circuit which respectively controls the units of the color measurement device CM depending on the functions of the units to derive a color of a measurement target. The control processing unit 6 is constructed, for example, such that it includes a CPU (Central Processing Unit) and its peripheral circuit. During execution of the control processing program, a control section 61, the control processing unit 6 is functionally included of a calibration amount processing section 62, a position processing section 63, and a color measurement processing section 64.

The control section 61 respectively controls the units of the color measurement device CM depending on the functions of the units.

The calibration amount processing section 62: causes the imaging unit 5 to acquire an image of a relative position calibration chart PCT; causes the color measuring unit 3 to subject the relative position calibration chart PCT to color measurement; and derives information about a relative position relationship between the color measuring unit 3 and the imaging unit 5, based on the calibration feature in the image of the relative position calibration chart PCT acquired by the imaging unit 5, and the calibration feature in a result of the color measurement of the relative position calibration chart PCT obtained by the color measuring unit 3. The relative position calibration chart PCT is a chart to be used for deriving the relative position relationship between the color measuring unit 3 and the imaging unit 5, and is marked with a calibration figure having a given calibration feature whose at least two positions are detectable along at least one of the main scanning direction (first direction, x-direction) and the sub scanning direction (second direction, y-direction).

More specifically, in one or more embodiments, the calibration amount processing section 62 functionally includes: a main-scanning-directional calibration amount processing subsection 621 for deriving first information about a relative position relationship in the main scanning direction; and a sub-scanning-directional calibration amount processing subsection 622 for deriving second information about a relative position relationship in the sub scanning direction. In one or more embodiments, the relative position calibration chart PCT includes a main-scanning-directional relative position calibration chart PhCT for deriving the first information about the relative position relationship in the main scanning direction; and a sub-scanning-directional relative position calibration chart PvCT for deriving second information about the relative position relationship in the sub scanning direction. The main-scanning-directional calibration amount processing subsection 621 is operable to: cause the imaging unit 5 to acquire an image of the main-scanning-directional relative position calibration chart PhCT; cause the color measuring unit 3 to subject the main-scanning-directional relative position calibration chart PhCT to color measurement; and derive first information about a relative position relationship between the color measuring unit 3 and the imaging unit 5 in the main scanning direction, based on the calibration feature in the image of the main-scanning-directional relative position calibration chart PhCT acquired by the imaging unit 5, and the calibration feature in a result of the color measurement of the main-scanning-directional relative position calibration chart PhCT obtained by the color measuring unit 3. The sub-scanning-directional calibration amount processing subsection 622 is operable to: cause the imaging unit 5 to acquire an image of the sub-scanning-directional relative position calibration chart PvCT; cause the color measuring unit 3 to subject the sub-scanning-directional relative position calibration chart PvCT to color measurement; and derive second information about a relative position relationship between the color measuring unit 3 and the imaging unit 5 in the sub scanning direction, based on the calibration feature in the image of the sub-scanning-directional relative position calibration chart PvCT acquired by the imaging unit 5, and the calibration feature in a result of the color measurement of the sub-scanning-directional relative position calibration chart PvCT obtained by the color measuring unit 3.

The position processing section 63 causes the imaging unit 5 to acquire an image of a color chart CT as one measurement target, and derives respective positions of a plurality of patches of the color chart CT based on the acquired image of the color chart CT. In one or more embodiments, the imaging unit 5 is constructed such that it includes a line sensor or the like. Thus, for example, the position processing section 63 is operable to cause the imaging unit 5 to acquire an image of the color chart CT while causing the sub-scanning-directionally moving unit (sheet conveyance unit) 2 to convey the color chart CT, and derive a displacement amount of the color chart CT, based on the acquired image of the color chart CT.

More specifically, for example, the position processing section 63 is operable to: subject the image of the color chart CT to binarization processing, using an edge filter usable for detecting an edge extending in one direction of an image, to thereby generate binarized horizontal edge image data and binarized vertical edge image data, respectively, in the horizontal direction (main scanning direction, x-direction) and the vertical direction (sub scanning direction, y-direction); further subject the generated image data to a Hough transform to thereby detect a plurality of horizontal edge lines and a plurality of vertical edge lines, respectively, in the horizontal direction and the vertical direction; and derive, as a position of each patch, an intersection of respective intermediate lines between adjacent ones of the horizontal edge lines and between adjacent ones of the horizontal edge lines.

The color measurement processing section 64 causes the color measuring unit 3 to measure the color of each of the plurality of patches, while correcting, according to the relative position relationship-related information derived by the calibration amount processing section 62, the position of each of the plurality of patches which has been derived by the position processing section 63 and is to be subjected to the color measurement by the color measuring unit 3.

Next, an operation of the color measurement device in accordance with one or more embodiments will be described. The color measurement device CM in accordance with one or more embodiments is operated according to a method which includes: a calibration amount processing step of: causing the imaging unit 5 to acquire an image of the relative position calibration chart PCT; causing the color measuring unit 3 to subject the relative position calibration chart PCT to color measurement; and deriving information about the relative position relationship between the color measuring unit 3 and the imaging unit 5, based on the calibration feature in the image of the relative position calibration chart PCT acquired by the imaging unit 5, and the calibration feature in a result of the color measurement of the relative position calibration chart PCT obtained by the color measuring unit 3; a position processing step of causing the imaging unit 5 to acquire an image of the color chart CT, and deriving a position of each of the plurality of patches based on the acquired image of the color chart CT; and a color measurement processing step of causing the color measuring unit 3 to measure the color of each of the plurality of patches, while correcting, by a calibration amount derived in the calibration amount processing step, the position of each of the plurality of patches which has been derived in the position processing step and is to be subjected to the color measurement by the color measuring unit 3. The position processing step and the calibration amount processing step need to be executed prior to the color measurement processing step. These steps will be more specifically described below, in order of the calibration amount processing step, the position processing step and the color measurement processing step.

Figure 5:
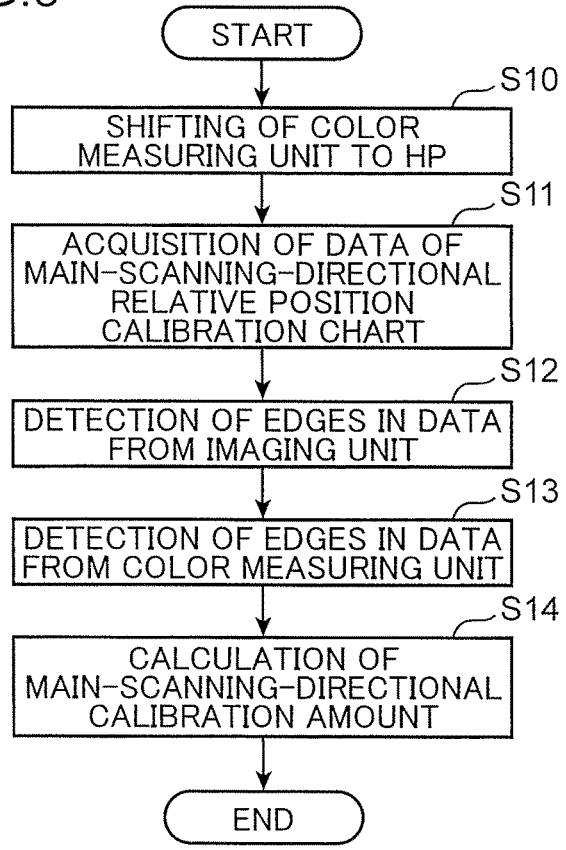
FIG. 5 is a flow chart depicting an operation of the color measurement device in accordance with one or more embodiments, in case of actually measuring first information about a relative position relationship between the imaging unit and the color measuring unit in a main scanning direction.
Figure 6:
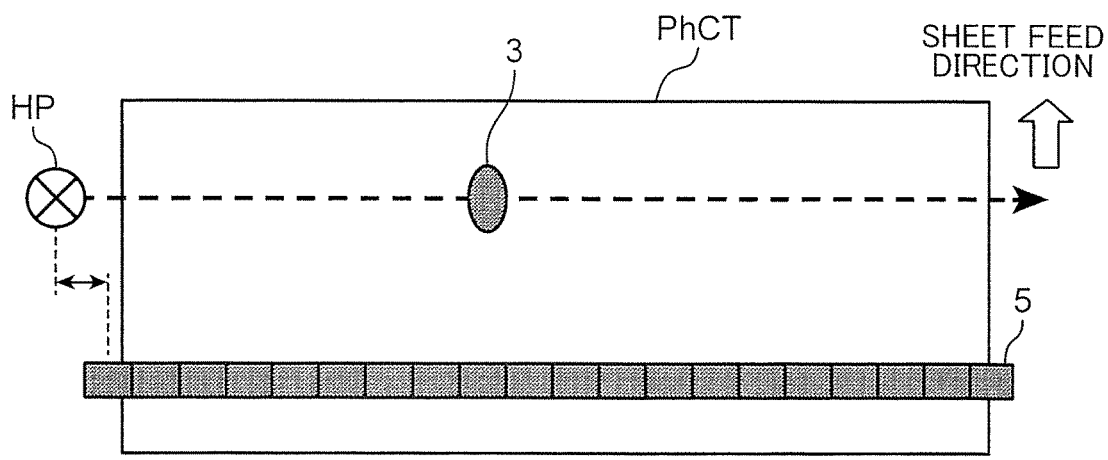
FIG. 6 is a diagram for explaining the first information about the relative position relationship between the imaging unit and the color measuring unit in the main scanning direction.
Figure 7A:
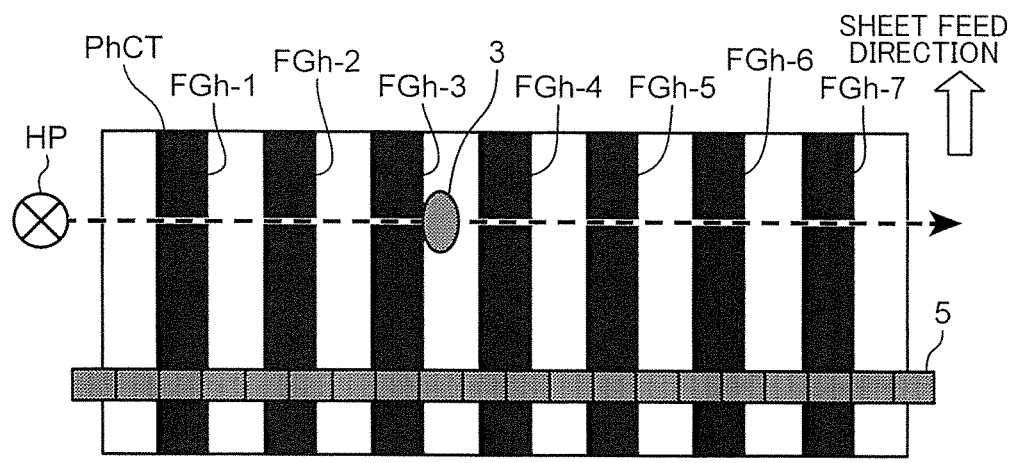
FIG. 7A is a diagram depicting a state of the actual measurement of the first information about the relative position relationship between the imaging unit and the color measuring unit in the main scanning direction.
Figure 7B:
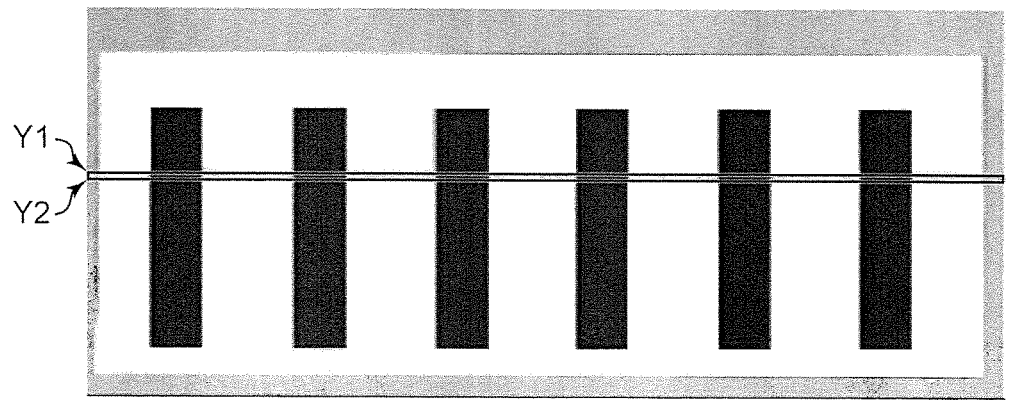
FIG. 7B is a diagram, obtained by an imaging unit, based on the measurement shown in FIG. 7A.
Figure 7C:
FIG. 7C is a diagram, obtained by the color measuring unit, based on the measurement shown in FIG. 7A.
Figure 8A:
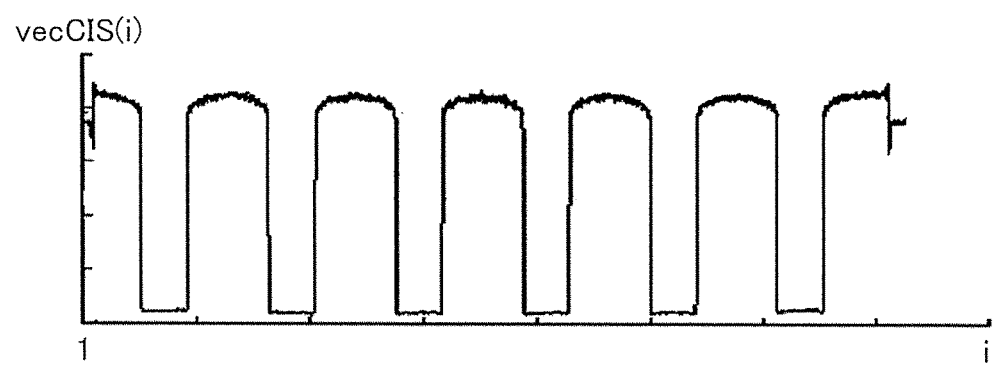
FIG. 8A is a chart depicting, as one example, data obtained by the imaging unit in the main scanning direction.
Figure 8B:
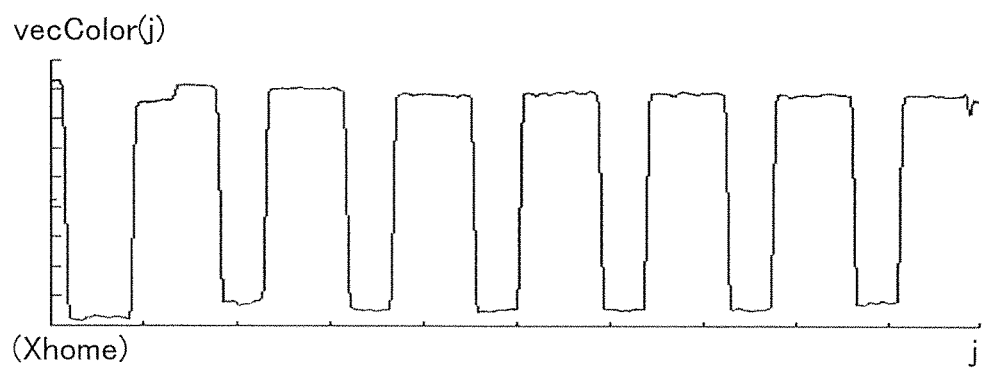
FIG. 8B is a chart depicting, as a second example, data obtained by the color measuring unit in the main scanning direction.
Figure 9:
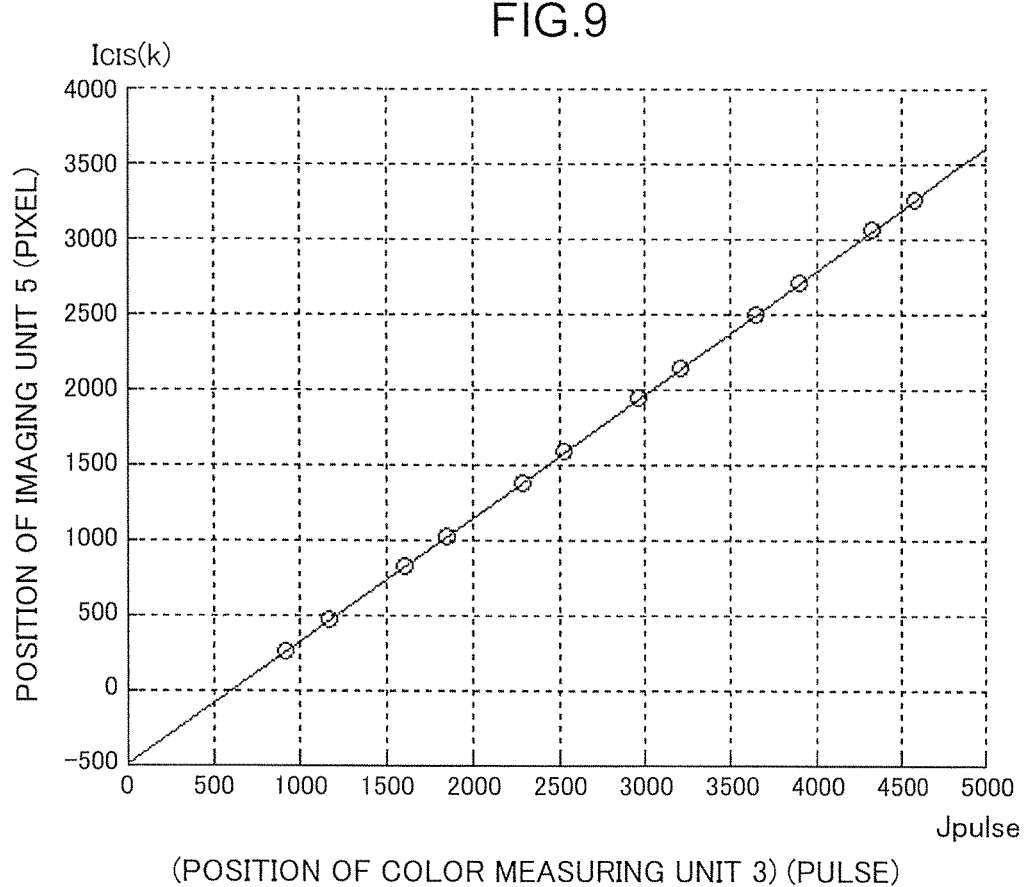
FIG. 9 is a graph depicting a relationship between an edge position based on data obtained by the color measuring unit, and an edge position based on data obtained by the imaging unit, in the main scanning direction.
Figure 10:
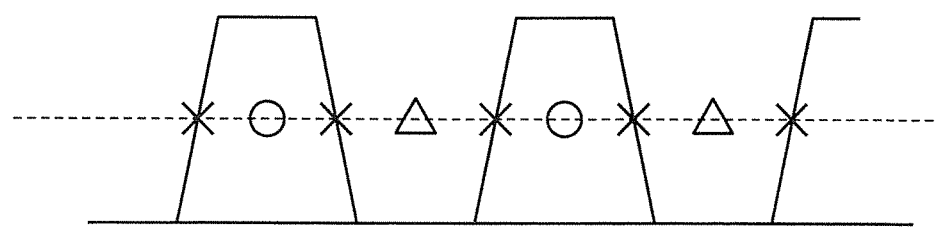
FIG. 10 is a diagram for explaining an intermediate position usable as a substitute for the edge position.
Figure 11:
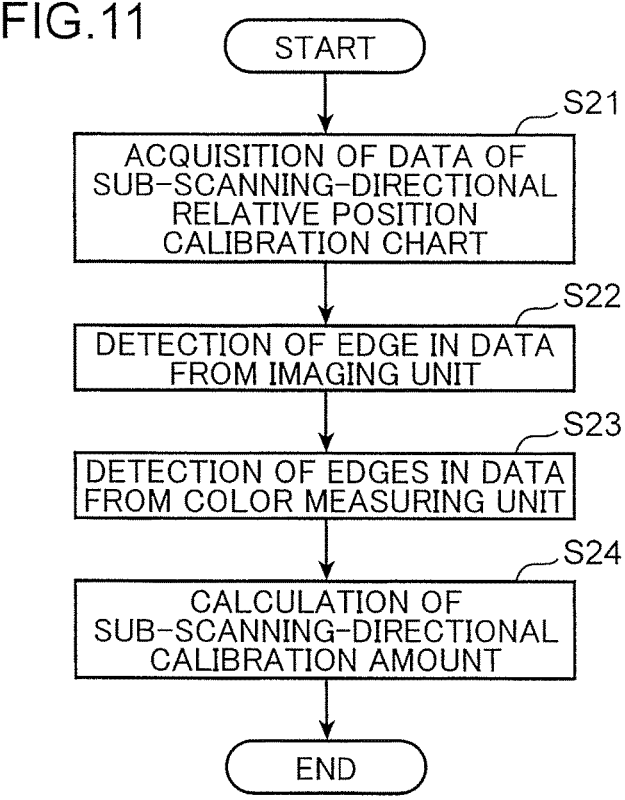
FIG. 11 is a flow chart depicting an operation of the color measurement device in accordance with one or more embodiments, in case of actually measuring second information about a relative position relationship between the imaging unit and the color measuring unit in a sub scanning direction.
Figure 12:
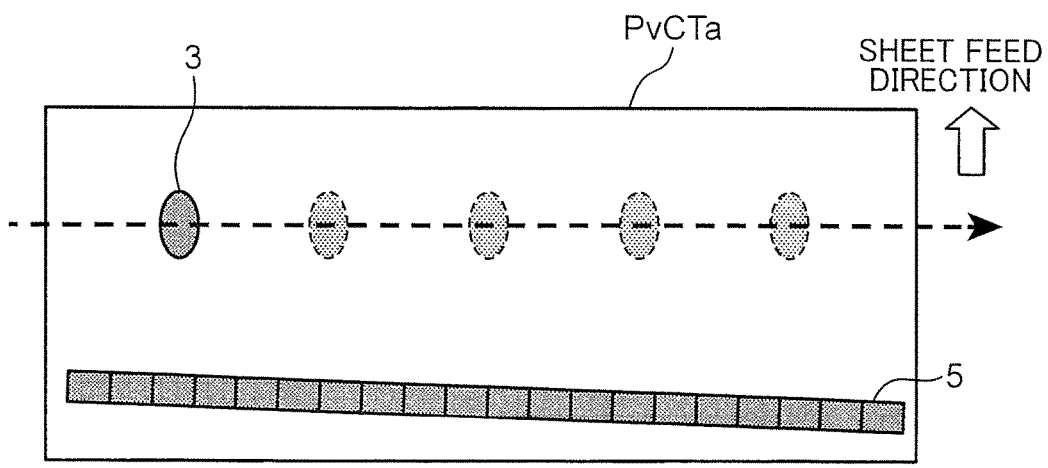
FIG. 12 is a diagram for explaining the second information about the relative position relationship between the imaging unit and the color measuring unit in the sub scanning direction.
Figure 14A:
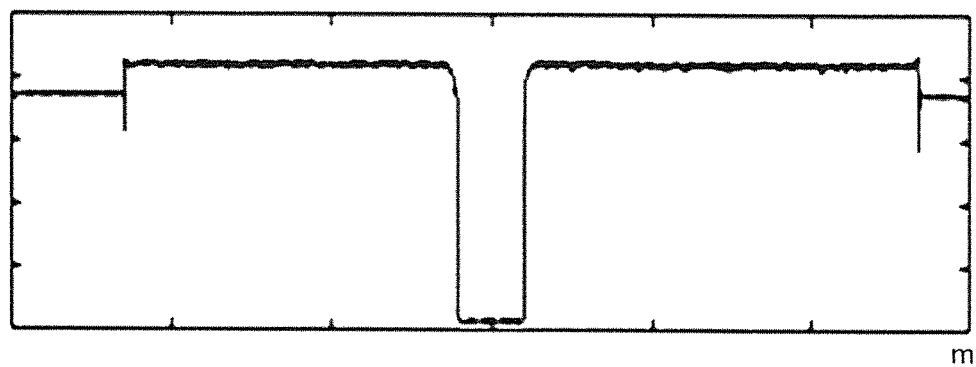
FIG. 14A is a chart depicting, as one example, data obtained by the imaging unit in the sub scanning direction.
Figure 14B:
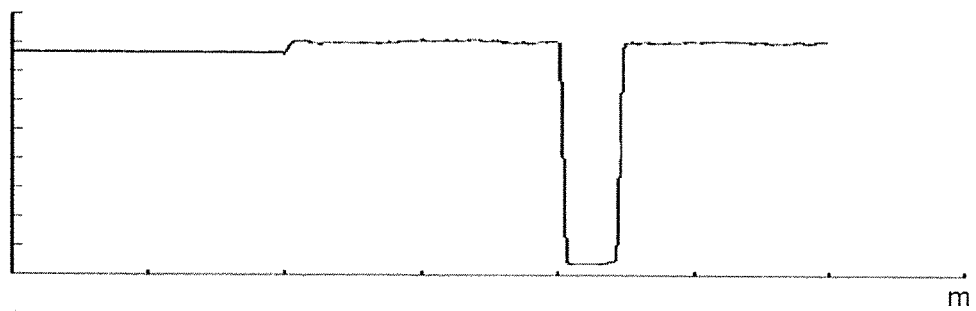
FIG. 14B is a chart depicting, as a second example, data obtained by the color measuring unit in the sub scanning direction.
Figure 15:
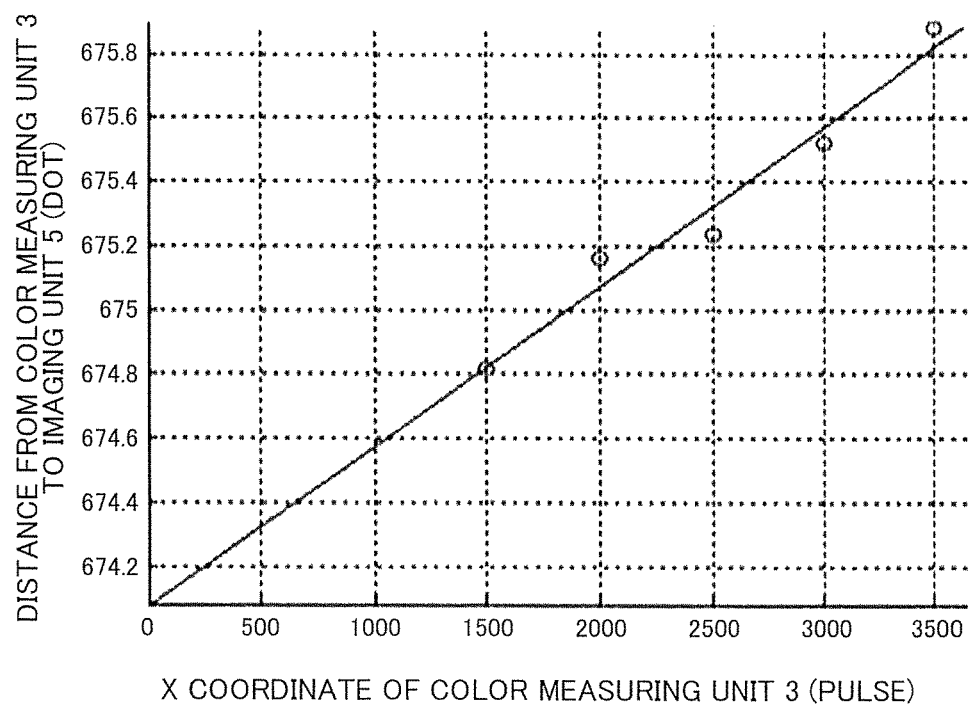
FIG. 15 is a graph depicting a relationship between an edge position based on data obtained by the color measuring unit, and an edge position based on data obtained by the imaging unit, in the sub scanning direction.
Figure 16:
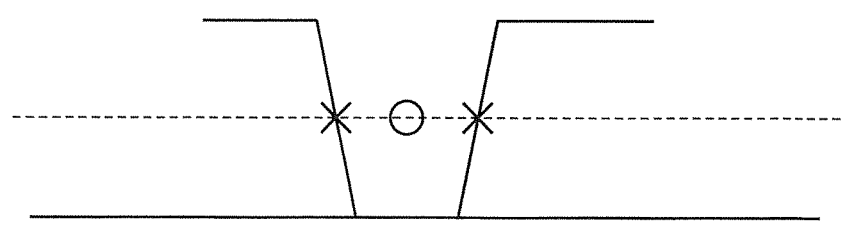
FIG. 16 is a diagram for explaining an intermediate position usable as a substitute for the edge position.

First of all, the calibration amount processing step will be more specifically described. FIG. 5 is a flow chart depicting an operation of the color measurement device in accordance with one or more embodiments, in case of actually measuring the first information about the relative position relationship between the imaging unit and the color measuring unit in the main scanning direction. FIG. 6 is a diagram for explaining the first information about the relative position relationship between the imaging unit and the color measuring unit in the main scanning direction. FIG. 7 is a diagram depicting a state of the actual measurement of the first information about the relative position relationship between the imaging unit and the color measuring unit in the main scanning direction, and one example of images based on respective pieces of data obtained by the imaging unit and the color measuring unit. Specifically, FIG. 7A, FIG. 7B and FIG. 7C depict, respectively: a state of the actual measurement of the first information about the relative position relationship between the imaging unit 5 and the color measuring unit 3 in the main scanning direction; one example of an image based on data obtained by the imaging unit 5; and an image extracted from the image in FIG. 7B at the same position as that of the color measuring unit 3. FIG. 8 is a chart depicting, as one example, respective pieces of data obtained by the imaging unit and the color measuring unit in the main scanning direction. Specifically, FIG. 8A depicts data based on data obtained by the imaging unit 5, wherein the horizontal axis represents a pixel site i of the imaging unit 5 along the main scanning direction, and the vertical axis represents an integrated value vecCIS (i) obtained by integrating pixel values from Y1 to Y2 in the sub scanning direction, at each pixel site i. A left end of the horizontal axis on the drawing sheet indicates the first (endmost) pixel at one end of the imaging unit 5. FIG. 8B depicts data obtained by the color measuring unit 3, wherein the horizontal axis represents a pulse number j of the first drive pulse to be given to the main-scanning stepping motor of the main-scanning-directionally moving unit 4 in order to move the color measuring unit 3 in the main scanning direction, and the vertical axis represents a color measurement value (color measurement result) vecColor from the color measuring unit 3. A left end of the horizontal axis on the drawing sheet indicates j=0, i.e., a state in which the color measuring unit 3 is located at a home position HP. FIG. 9 is a graph depicting a relationship between an edge position based on data obtained by the color measuring unit, and an edge position based on data obtained by the imaging unit, in the main scanning direction. In FIG. 9, the horizontal axis represents an edge position $X_{pulse}$ based on data obtained by the color measuring unit, and the vertical axis represents an edge position $X_{CIS}$ based on data obtained by the imaging unit. FIG. 10 is a diagram for explaining an intermediate position usable as a substitute for the edge position. FIG. 11 is a flow chart depicting an operation of the color measurement device in accordance with one or more embodiments, in case of actually measuring second the information about the relative position relationship between the imaging unit and the color measuring unit in the sub scanning direction. FIG. 12 is a diagram for explaining the second information about the relative position relationship between the imaging unit and the color measuring unit in the sub scanning direction. FIG. 13 is a diagram depicting a state of the actual measurement of the second information about the relative position relationship between the imaging unit and the color measuring unit in the sub scanning direction, and one example of images based on respective pieces of data obtained by the imaging unit and the color measuring unit. Specifically, FIG. 13A, FIG. 13B and FIG. 13C depict, respectively: a state of the actual measurement of the second information about the relative position relationship between the imaging unit and the color measuring unit in the sub scanning direction; one example of an image based on data obtained by the imaging unit 5; and an image extracted from the image in FIG. 13B at the same position as that of the color measuring unit 3. FIG. 14 is a chart depicting, as one example, respective pieces of data obtained by the imaging unit and the color measuring unit in the sub scanning direction. Specifically, FIG. 14A depicts data based on data obtained by the imaging unit 5, wherein the horizontal axis represents a pulse number m of the second drive pulse to be given to the sub-scanning stepping motor of the sub-scanning-directionally moving unit 2 in order to move the relative position calibration chart PCT in the sub scanning direction, and the vertical axis represents an integrated value horCIS (i) obtained by integrating pixel values from X1 to X2 in the main scanning direction, at each pulse number. FIG. 14B depicts data obtained by the color measuring unit 3, wherein the horizontal axis represents the pulse number m of second drive pulse to be given to the sub-scanning stepping motor of the sub-scanning-directionally moving unit 2 in order to move the relative position calibration chart PCT in the sub scanning direction, and the vertical axis represents a color measurement value (color measurement result) horColor from the color measuring unit 3. FIG. 15 is a graph depicting a relationship between an edge position based on data obtained by the color measuring unit, in the sub scanning direction, and an edge position based on data obtained by the imaging unit, in the sub scanning direction. In FIG. 15, the horizontal axis represents a position $X_{pulse}$ of the color measuring unit, and the vertical axis represents a distance $L_0$ between then edge position based on the data obtained by the color measuring unit 3 and the edge position based on the data obtained by the imaging unit 5. FIG. 16 is a diagram for explaining an intermediate position usable as a substitute for the edge position.

The information about the relative position relationship between the color measuring unit 3 and the imaging unit 5 includes information indicative of a location of one of the two units on the basis of a location of the other unit, and information about respective movement amounts per unitary instruction of the color measuring unit 3 and the imaging unit 5, wherein the location can be expressed by a position in the main scanning direction (first direction, x-direction) and a position in the sub scanning direction (second direction, y-direction). Each of the movement amounts per unitary instruction is, as regards the main scanning direction, a movement amount of the color measuring unit 3 and a pixel site of the imaging unit 5 corresponding to a resulting destination location of the color measuring unit 3, in case of moving the color measuring unit 3 in the main scanning direction according to one first drive pulse, and, as regards the sub scanning direction, a movement amount of a given sheet which is moved in the sub scanning direction according to one second drive pulse. Therefore, the calibration amount processing step includes: a main-scanning-directional calibration amount processing substep of deriving the first information about the relative position relationship between the color measuring unit 3 and the imaging unit 5 in the main scanning direction; and a sub-scanning-directional calibration amount processing substep of deriving the second information about the relative position relationship between the color measuring unit 3 and the imaging unit 5 in the sub scanning direction.

As regards the main scanning direction, in one or more embodiments, the color measuring unit 3 is constructed to be moved from the home position HP in the main scanning direction by the main-scanning-directionally moving unit 4, in proportion to the pulse number of the first drive pulse given to the first pulse of the motor the main-scanning-directionally moving unit 4, as depicted in FIGS. 1, 2, 3 and 6. On the other hand, in the imaging unit 5, a large number of pixels are arranged along the main scanning direction. Thus, in the main-scanning-directional calibration amount processing substep, a distance between the home position HP of the color measuring unit 3 and one end of the imaging unit 5, along the main scanning direction, and a pixel count of the imaging unit 5 per unit movement amount of the color measuring unit 3, are derived as the first information about the relative position relationship. More specifically, in one or more embodiments, as one example, an installation position of the imaging unit 5 is used as a reference position. Thus, in the main-scanning-directional calibration amount processing substep, an x-coordinate value of the home position HP of the color measuring unit 3 is derived as data about the distance between the home position HP of the color measuring unit 3 and the one end of the imaging unit 5 along the main scanning direction. Then, data indicative of to how many pixels of the imaging unit 5 the movement amount of the color measuring unit 3 according to one first drive pulse corresponds is derived as the pixel count of the imaging unit 5 per unit movement amount of the color measuring unit 3.

On the other hand, as regards the sub scanning direction, in one or more embodiments, the color measuring unit 3 and the imaging unit 5 are fixed, and a positional relationship of a given sheet (e.g., the relative position calibration chart PCT or the color chart CT) and each of the color measuring unit 3 and the imaging unit 5 is changed when the given sheet is moved by the sub-scanning-directionally moving unit (sheet conveyance unit) 2. The given sheet is moved in the sub scanning direction in proportion to the pulse number of the second drive pulse given to the second pulse motor of the sub-scanning-directionally moving unit 2. Thus, in the sub-scanning-directional calibration amount processing substep, a pulse number of the second drive pulse for moving the given sheet by a distance between the color measuring unit 3 and the imaging unit 5 along the sub scanning direction is derived as the second information about the relative position relationship. That is, a pulse number of the second drive pulse in a period of time after imaging a specific position of the given sheet by the imaging unit 5 through until the specific position is shifted to a position for color measurement by the color measuring unit 3, according to sheet feeding, is derived.

More specifically, in the main-scanning-directional calibration amount processing substep of the calibration amount processing step, when the main-scanning-directional relative position calibration chart PhCT is placed in the sheet feeding unit 1 and then start of the calibration is instructed through the input unit 7, the main-scanning-directional calibration amount processing subsection 621 of the calibration amount processing section 62 operates to move the color measuring unit 3 to the home position HP, as depicted in FIG. 5 (S10). The home position HP is a standby position of the color measuring unit 3, and is one adjacent end of a movable range of the color measuring unit 3, as depicted in FIG. 6. Thus, in the processing S10, the color measuring unit 3 is shifted to the home position HP by the main-scanning-directionally moving unit 4, in such a manner that it is moved until it becomes immovable, for example, due to so-called "mechanical contact".

The main-scanning-directional relative position calibration chart PhCT is a chart to be used for deriving the first information about the relative position relationship between the color measuring unit 3 and the imaging unit 5, and is a chart marked with a calibration figure FGh having a given calibration feature whose at least two positions are detectable along the main scanning direction (first direction, x-direction). More specifically, as one example, the main-scanning-directional relative position calibration chart PhCT is a chart in which a plurality of quadrangles (vertical bar-like figures) each formed in a shape which is long in the sub scanning direction (second direction, y-direction), to serve as the calibration figured FGh, are marked on a plain sheet in such a manner that they are arranged side-by-side along the main scanning direction, as depicted in FIG. 7. In the example depicted in FIG. 7, seven quadrangles FGh-1 to FGh-7 are marked. As above, the main-scanning-directional relative position calibration chart PhCT can be easily prepared simply by marking a plurality of sub-scanning-directionally long quadrangles FGh as calibration figures FG Subsequently, the main-scanning-directional calibration amount processing subsection 621 operates to acquire data of the main-scanning-directional relative position calibration chart PhCT (S11). More specifically, in one example, the main-scanning-directional calibration amount processing subsection 621 operates to cause the imaging unit 5 to acquire, in the forward feeding mode, an image of the main-scanning-directional relative position calibration chart PhCT along the main scanning direction, by a preset length (e.g., from a position Y1 to a position Y2). Explaining in more detail, the main-scanning-directional calibration amount processing subsection 621 operates to cause the sub-scanning-directionally moving unit 2 to convey, in the forward feeding mode, i.e., in the sub scanning direction, the main-scanning-directional relative position calibration chart PhCT from the position Y1 to the position Y2 each preliminarily set along the sub scanning direction, and, in synchronization with this conveyance in the sub scanning direction, cause the imaging unit 5 to image the main-scanning-directional relative position calibration chart PhCT with respect to each line along the main scanning direction (x-direction) to thereby acquire an image of the main-scanning-directional relative position calibration chart PhCT. Then, the main-scanning-directional calibration amount processing subsection 621 operates to cause the color measuring unit 3 to subject the main-scanning-directional relative position calibration chart PhCT to color measurement along the main scanning direction, in the same region as that of the image of the main-scanning-directional relative position calibration chart PhCT acquired by the imaging unit 5. More specifically, the main-scanning-directional calibration amount processing subsection 621 operates to cause the color measuring unit 3 to subject the main-scanning-directional relative position calibration chart PhCT to color measurement in response to each drive pulse, while causing the sub-scanning-directionally moving unit 2 to convey the main-scanning-directional relative position calibration chart PhCT along the sub scanning direction so as to allow the color measuring unit 3 to measure the same region as that of the image of the main-scanning-directional relative position calibration chart PhCT acquired by the imaging unit 5, and causing the main-scanning-directionally moving unit 4 to move the color measuring unit 3 from the home position HP, i.e., the one end of the movable range, to the other end of the movable range, to thereby acquire a result of the color measurement of the main-scanning-directional relative position calibration chart PhCT. As regards the conveyance of the main-scanning-directional relative position calibration chart PhCT along the sub scanning direction, which is performed so as to allow the color measuring unit 3 to perform color measurement in the same region as that of the image of the main-scanning-directional relative position calibration chart PhCT acquired by the imaging unit 5, a certain level of error is permissive in case of deriving the first information about the relative position relationship. Thus, for example, this conveyance is executed using a design value such as a distance between the imaging unit 5 and the color measuring unit 3 along the sub scanning direction.

As one example, FIG. 7B depicts an image of the main-scanning-directional relative position calibration chart PhCT including the region from the position Y1 to the position Y2, acquired by the imaging unit 5, and FIG. 7C depicts an image obtained by extracting the region from the position Y1 to the position Y2, from the image in FIG. 7B. In the example depicted in FIG. 7B, the image of the main-scanning-directional relative position calibration chart PhCT is acquired in a region extending beyond the region from the position Y1 to the position Y2. As above, the image of the main-scanning-directional relative position calibration chart PhCT to be acquired by the imaging unit 5 in the processing S11 simply needs to include a region to be subjected to color measurement by the color measuring unit 3. In other words, a certain region of the main-scanning-directional relative position calibration chart PhCT included in the image of the main-scanning-directional relative position calibration chart PhCT acquired by the imaging unit 5 may be subjected to color measurement by the color measuring unit 3.

Subsequently, the main-scanning-directional calibration amount processing subsection 621 operates to detect respective positions of edges in the calibration figures FGh, from the image of the main-scanning-directional relative position calibration chart PhCT acquired by the imaging unit 5 (S12). More specifically, the main-scanning-directional calibration amount processing subsection 621 operates to integrate pixel values of the pixels from the position Y1 to the position Y2 along the y-direction, in the image of the main-scanning-directional relative position calibration chart PhCT acquired by the imaging unit 5, to thereby generate vertical edge graph data related to the imaging unit 5. That is, the main-scanning-directional calibration amount processing subsection 621 operates to integrate all of the pixel values in a y-coordinate range of Y1 to Y2 at each pixel site i on the horizontal axis, in the image of the main-scanning-directional relative position calibration chart PhCT acquired by the imaging unit 5. This provides an integrated value calculated by integrating the pixel values along the y-direction at each pixel site i. As one example, FIG. 8A depicts vertical edge graph data vecCIS (i) related to the imaging unit 5, which is generated with respect to the image of the main-scanning-directional relative position calibration chart PhCT depicted in FIG. 7C. In the resulting vertical edge graph data vecCIS (i) related to the imaging unit 5, respective positions of a plurality of first vertical edges related to the imaging unit 5 are detected.

Subsequently, the main-scanning-directional calibration amount processing subsection 621 operates to detect respective positions of edges in the calibration figures FGh, from a result of the color measurement of the main-scanning-directional relative position calibration chart PhCT obtained by the color measuring unit 3 (S13). As one example, FIG. 8B depicts a color measurement result vecColor (j) of the main-scanning-directional relative position calibration chart PhCT depicted in FIG. 7C. In the color measurement result vecColor (j) related to the color measuring unit 3, respective positions of a plurality of second vertical edges related to the color measuring unit 3 are detected.

Subsequently, the main-scanning-directional calibration amount processing subsection 621 operates to calculate first information about a relative position relationship between the color measuring unit 3 and the imaging unit 5 in the main scanning direction, based on a processing result in the processing S12 and a processing result in the processing S13, and store the calculated first information about the relative position relationship, in the storage unit 9 (S14).

More specifically, assuming that an x-coordinate value of the first (endmost) pixel at the one end of the imaging unit 5 is represented as $X_{CIS}(1)=0$, and a pixel interval (pixel pitch) in the imaging unit 5 is represented as $\Delta X_{CIS}$, an x-coordinate value $X_{CIS}(i)$ of an i-th pixel of the imaging unit 5 is given by the following formula (1).

$$X_{CIS}(i)=(i-1)\times\Delta X_{CIS} \qquad (1)$$

As mentioned above, the color measuring unit 3 can be moved from the home position HP in the main scanning direction (x-direction) by a coordinate value proportional to the pulse number of the first drive pulse given to the first pulse motor. Provided that an x-coordinate value of the home position HP is expressed as $X_{home}$, and the color measuring unit 3 is moved by $\Delta X_{pulse}$ per pulse, an x-coordinate value $X_{pulse}$ (j) of the color measuring unit 3 from the home position when the pulse number is j is given by the following formula (2).

$$X_{pulse}(j) = X_{home} + j \times \Delta X_{pulse} \qquad (2)$$

Assuming that the home position HP is located at an $I_{home}$-th pixel site on the imaging unit 5, the x-coordinate value $X_{home}$ of the home position HP is expressed as the following formula (3) from the formula (1).

$$X_{home} = (I_{home} - 1) \times \Delta X_{CIS} \qquad (3)$$

By assigning this formula (3) to the formula (2), the following formula (4) is obtained.

$$X_{pulse}(j) = (I_{home} - 1) \times \Delta X_{CIS} + j \times \Delta X_{pulse} \qquad (4)$$

Assume that one edge position of the calibration figures FGh in the image of the main-scanning-directional relative position calibration chart PhCT acquired by the imaging unit 5 is an $I_{CIS}$-th pixel site. On the other hand, assume that one edge position of the calibration figures FGh in data about the color measurement result by the color measuring unit 3 is a pixel site shifted from the home position by $J_{pulse}$. Then, assuming that the one edge position of the calibration figures FGh in the image of the main-scanning-directional relative position calibration chart PhCT acquired by the imaging unit 5 is coincident with the one edge position of the calibration figures FGh in data about the color measurement result by the color measuring unit 3, the x-coordinate value in the formula (1) is equal to the x-coordinate value in the formula (4) and thereby the following formula (5) is given. Then, the following formula (6) is derived.

$$(I_{cis} - 1) \times \Delta X_{CIS} = (I_{home} - 1) \times \Delta X_{cis} + J_{pulse} \times \Delta X_{pulse} \qquad (5)$$

$$I_{CIS} = I_{home} + J_{pulse} \times \frac{\Delta X_{pulse}}{\Delta X_{CIS}} \qquad (6)$$

Assume that a pixel site of the imaging unit 5 and a position of the color measuring unit 3 at a k-th edge are expressed, respectively, as $I_{CIS}(k)$ and $J_{pulse}(k)$. Then, when positions of respective edges derived based on the formula (6) are plotted on a coordinate space in which the horizontal axis represents $J_{pulse}(k)$ and the vertical axis represents $I_{CIS}(k)$, a y-intercept and a slope of a resulting line are indicative of $I_{home}$ and $\Delta X_{pulse}/\Delta X_{CIS}$, respectively. Thus, an x-coordinate value $I_{home}$ of the home position HP of the color measuring unit 3 is derived, and then a ratio $\Delta X_{pulse}/\Delta X_{CIS}$ of a movement amount of the color measuring unit 3 according to one first drive pulse to a corresponding pixel count in the imaging unit 5 is derived.

In case of using edge positions in an number of greater than two, a straight line most fitting (conforming) to edge position plots is derived by the method of least squares, and a y-intercept and a slope of the straight line are indicative of $I_{home}$ and $\Delta X_{pulse}/\Delta X_{CIS}$, respectively.

More specifically, in the above processing S14, the main-scanning-directional calibration amount processing subsection 621 operates to: plot a plurality of sets of corresponding edge positions obtained in the processing S12 and the processing S13, on a coordinate space in which the horizontal axis represents $J_{pulse}(k)$ and the vertical axis represents $I_{CIS}(k)$; derive a straight line most fitting (conforming) to the edge position plots by the method of least squares; and derive a y-intercept and a slope of the derived straight line, as $I_{home}$ and $\Delta X_{pulse}/\Delta X_{CIS}$, respectively.

As one example, FIG. 9 depicts a straight line obtained by the method of least squares in such a manner as to most fit (conform) to plots (○) of the edge positions derived from FIG. 8A and FIG. 8B. In FIG. 9, fourteen edge position plots (○) plotted from the left side to the right side of the drawing sheet correspond, respectively, to positions of seven sets of main-scanning-directionally opposite edges of the seven calibration figures FGh-1 to FGh-7.

As above, by executing the processing S10 to the processing S14 in the above manner, the main-scanning-directional calibration amount processing substep is performed so as to cause the main-scanning-directional calibration amount processing subsection 621 to derive the first information about the relative position relationship between the color measuring unit 3 and the imaging unit 5 in the main scanning direction.

In one or more embodiments, positions of the first vertical edges related to the imaging unit 5 and positions of the second vertical edges related to the color measuring unit 3 are used, as mentioned above. Alternatively, intermediate positions between adjacent ones of the first vertical edges (first vertical intermediate position) and intermediate positions between adjacent ones of the second vertical edges (second vertical intermediate position) may be used. For example, the main-scanning-directional calibration amount processing subsection 621 operates to: detect, as the first vertical edges, a plurality of edges in the calibration figures FGh based on the image of the main-scanning-directional relative position calibration chart PhCT acquired by the imaging unit 5; detect, as the second vertical edges, a plurality of edges in the calibration figures FGh based on the color measurement result of the main-scanning-directional relative position calibration chart PhCT obtained by the color measuring unit 3; and derive the first information about the relative position relationship between the color measuring unit 3 and the imaging unit 5, based on first intermediate positions between adjacent ones of the detected first vertical edges and second intermediate positions between adjacent ones of the detected first vertical edges. For example, as depicted in FIG. 10, each of the first and second intermediate positions is derived as an intermediate position (○ or Δ) having a coordinate (x) at which each edge in a corresponding one of the vertical edge graph data vecCIS (i) and the color measurement result vecColor (j) of the main-scanning-directional relative position calibration chart PhCT obtained by the color measuring unit 3 cuts across a preset given threshold (third threshold, e.g., one-half of a peak value) th3.

In one or more embodiments, the first information about the relative position relationship between the color measuring unit 3 and the imaging unit 5 in the main scanning direction is derived during the course of moving the color measuring unit 3 from the home position HP to the other end of the movable range of the color measuring unit along the main scanning direction. Alternatively, it may be additionally derived during the course of moving the color measuring unit 3 from the other end of the movable range of the color measuring unit to the home position HP along the main scanning direction. By deriving the first information about the relative position relationship in the both directions, it becomes possible to perform calibration even in a situation where backlash occurs during a change in feeding direction.

On the other hand, the sub-scanning-directional calibration amount processing substep of the calibration amount processing step is a step of deriving the second information about the relative position relationship between the color measuring unit 3 and the imaging unit 5 in the sub scanning direction, as mentioned above. The relative position relationship between the color measuring unit 3 and the imaging unit 5 in the sub scanning direction may be derived at any one site along the main scanning position. However, as depicted in FIG. 12, there is a situation where, due to an installation error of the imaging unit 5 which is long along the main scanning direction, a movement trajectory along which the color measuring unit 3 is moved in the main scanning direction is not parallel to the imaging unit 5, i.e., the imaging unit 5 is inclined with respect to the movement trajectory of the color measuring unit 3. This means that a distance between the color measuring unit 3 and the imaging unit 5 in the sub scanning direction varies at each position along the main scanning direction. Thus, in one or more embodiments, the second information about the relative position relationship between the color measuring unit 3 and the imaging unit 5 in the sub scanning direction is derived at a plurality of sites along the main scanning direction. More specifically, in the sub-scanning-directional calibration amount processing substep, the following processing is executed.

First of all, when the sub-scanning-directional relative position calibration chart PvCT is placed in the sheet feeding unit 1 and then start of the calibration is instructed through the input unit 7, the sub-scanning-directional calibration amount processing subsection 622 of the calibration amount processing section 62 operates to acquire data of the sub-scanning-directional relative position calibration chart PvCT, as depicted in FIG. 11 (S21). More specifically, in one example, the sub-scanning-directional calibration amount processing subsection 622 operates to cause the imaging unit 5 to acquire, in the forward feeding mode, an image of the sub-scanning-directional relative position calibration chart PvCT along the sub scanning direction, by a preset length, in such a manner as to include a calibration figure FGv. Explaining in more detail, the sun-scanning-directional calibration amount processing subsection 622 operates to cause the sub-scanning-directionally moving unit 2 to convey, in the forward feeding mode, i.e., in the sub scanning direction, the sub-scanning-directional relative position calibration chart PvCT from a certain position to another certain position each preliminarily set along the sub scanning direction, in such a manner as to include the calibration figure FGv, and, in synchronization with this conveyance in the sub scanning direction (in response to each second drive pulse), cause the imaging unit 5 to image the sub-scanning-directional relative position calibration chart PvCT with respect to each line along the main scanning direction (x-direction) to thereby acquire an image of the sub-scanning-directional relative position calibration chart PvCT. Concurrently, the sub-scanning-directional calibration amount processing subsection 622 operates to cause the color measuring unit 3 to subject the sub-scanning-directional relative position calibration chart PvCT to color measurement at respective ones of a plurality of sites preliminarily set at given intervals along the main scanning direction. That is, while the sub-scanning-directional relative position calibration chart PvCT is conveyed in response to each pulse, an image of one line is taken by the imaging unit 5, and the color measuring unit 3 performs color measurement at its position, i.e., the image taking by the imaging unit 5 and the color measurement by the color measuring unit 3 are concurrently performed.

The sub-scanning-directional relative position calibration chart PvCT is a chart to be used for deriving the second information about the relative position relationship between the color measuring unit 3 and the imaging unit 5, and is a chart marked with a calibration figure FGv having a given calibration feature whose position is detectable along the sub scanning direction (second direction, y-direction). More specifically, as one example, the sub-scanning-directional relative position calibration chart PvCT is a chart in which a quadrangle (vertical bar-like figure) formed in a shape which is long in the main scanning direction (first direction, x-direction), to serve as the calibration figured FGv, are marked on a plain sheet, as depicted in FIG. 13. As above, the sub-scanning-directional relative position calibration chart PvCT can be easily prepared simply by marking a main-scanning-directionally long quadrangle FGv as a calibration figure FG.

As one example, FIG. 13B depicts an image of the sub-scanning-directional relative position calibration chart PvCT acquired by the imaging unit 5, and FIG. 13C depicts an image obtained by extracting a region from a position X1 to a position X2, from the image in FIG. 13B. In FIG. 13B, the region from the position X1 to the position X2 is also shown in the sub-scanning-directional relative position calibration chart PvCT. As mentioned above, the second information about the relative position relationship between the color measuring unit 3 and the imaging unit 5 in the sub scanning direction is derived at a plurality of sites along the main scamming direction. The region from the position X1 to the position X2 is shown as one of the plurality of sites. As regards a position on the image of the sub-scanning-directional relative position calibration chart PvCT acquired by the imaging unit 5, corresponding to each of the plurality of sites to be subjected to color measurement by the color measuring unit 3 (in the example depicted in FIG. 13B, a position of the region from the position X1 to the position X2), a certain level of error is permissive in case of deriving the second information about the relative position relationship. Thus, for example, the second information is derived using a design value such as a distance between the imaging unit 5 and the color measuring unit 3 along the main scanning direction. Alternatively, the first information about the relative position relationship derived in the main-scanning-directional calibration amount processing substep may be used.

Subsequently, the sub-scanning-directional calibration amount processing subsection 622 operates to detect respective positions of edges in areas of the calibration figure FGv corresponding to the plurality of sites preliminarily set at given intervals along the main scanning direction, from the image of the sub-scanning-directional relative position calibration chart PvCT acquired by the imaging unit 5 (S22). More specifically, for example in the region from the position X1 to the position X2 in the above example, the sub-scanning-directional calibration amount processing subsection 622 operates to integrate pixel values of pixels from the position X1 to the position X2 along the x-direction, in the image of the sub-scanning-directional relative position calibration chart PvCT acquired by the imaging unit 5, to thereby generate horizontal edge graph data related to the imaging unit 5. That is, the sub-scanning-directional calibration amount processing subsection 622 operates to integrate all of the pixel values in an x-coordinate range of X1 to X2 at each pulse number m for the conveyance in the sub scanning direction, in the image of the sub-scanning-directional relative position calibration chart PvCT acquired by the imaging unit 5. This provides an integrated value calculated by integrating the pixel values along the x-direction. As one example, FIG. 14A depicts horizontal edge graph data horCIS (m) related to the imaging unit 5, which is generated with respect to the region from the position X1 to the position X2 in the image of the sub-scanning-directional relative position calibration chart PvCT depicted in FIG. 13B. In the resulting horizontal edge graph data horCIS (m) related to the imaging unit 5, positions of two first horizontal edges are detected from the horizontal edge graph data horCIS (m). This processing is executed at each of the plurality of sites preliminarily set at given intervals along the main scanning direction.

Subsequently, the sub-scanning-directional calibration amount processing subsection 622 operates to detect respective positions of edges in areas of the calibration figure FGv corresponding to the plurality of sites preliminarily set at given intervals along the main scanning direction, from a result of the color measurement of the sub-scanning-directional relative position calibration chart PvCT obtained by the color measuring unit 3 (S23). As one example, FIG. 14B depicts a color measurement result horColor (m) of the sub-scanning-directional relative position calibration chart PvCT depicted in FIG. 7C in the region from the position X1 to the position X2. From the color measurement result horColor (m) related to the color measuring unit 3, positions of two second horizontal edges related to the color measuring unit 3 are detected. This processing is executed at each of the plurality of sites preliminarily set at given intervals along the main scanning direction.

Subsequently, the sub-scanning-directional calibration amount processing subsection 622 operates to calculate second information about a relative position relationship between the color measuring unit 3 and the imaging unit 5 in the sub scanning direction, based on a processing result in the processing S22 and a processing result in the processing S23 (S24).

More specifically, from a different between one of the first horizontal edge positions related to the imaging unit 5, derived in the processing S22, and a corresponding one of the second horizontal edge positions related to the color measuring unit 3, derived in the processing S23, it is possible to derive a pulse number of the second drive pulse to be given to the sub-scanning stepping motor of the sub-scanning-directionally moving unit 2, which is necessary to move the color measuring unit 3 by a sub-scanning-directional distance $L_0$ (k) between the color measuring unit 3 and the imaging unit 5 at a x-coordinate position (x=$X_{pulse}$ (k)) of a certain one of the plurality of sites, i.e., necessary to shift a certain position of the sub-scanning-directional relative position calibration chart PvCT from the position of the imaging unit 5 to the position of the color measuring unit 3. When the imaging unit 5 is inclined with respect to the movement trajectory of the color measuring unit 3, the following formula (7) is satisfied between $X_{pulse}$ (k) of the plurality of sites and the distance $L_0$ (k).

$$L_0(k)=a \cdot X_{pulse}(k)+b \tag{7}$$

More specifically, in the above processing S24, the sub-scanning-directional calibration amount processing subsection 622 operates to: derive the distance $L_0$ (k) from the edge positions obtained in the processing S22 and the processing S23, at $X_{pulse}$ (k) of the plurality of sites preliminarily set at given intervals along the main scanning direction; plot a plurality of derived values of the distance $L_0$ (k) on a coordinate space in which the horizontal axis represents $X_{pulse}$ (k) of each of the plurality of sites preliminarily set at given intervals along the main scanning direction, and the vertical axis represents the distance $L_0$ (k); derive a straight line most fitting (conforming) to plots of the distance $L_0$ (k) by the method of least squares; and derive a y-intercept and a slope of the derived straight line, as "b" in the formula 7 and "a" in the formula 7, respectively.

As one example, FIG. 15 depicts a straight line obtained by the method of least squares in such a manner as to most fit (conform) to plots (○) of the distance $L_0$ (k) at $X_{pulse}$ (k) of the plurality of sites, derived from FIG. 14A and FIG. 14B. In FIG. 15, five plots (○) of the distance $L_0$ (k) plotted from the left side to the right side of the drawing sheet correspond, respectively, to five sites depicted in FIG. 13A.

As above, by executing the processing S21 to the processing S24 in the above manner, the sub-scanning-directional calibration amount processing substep is performed so as to cause the sub-scanning-directional calibration amount processing subsection 622 to derive the second information about the relative position relationship between the color measuring unit 3 and the imaging unit 5 in the sub scanning direction.

In one or more embodiments, positions of the first horizontal edges related to the imaging unit 5 and positions of the second horizontal edges related to the color measuring unit 3 are used, as mentioned above. Alternatively, intermediate positions between adjacent ones of the first horizontal edges (first horizontal intermediate positions) and intermediate position between adjacent ones of the second horizontal edges (second horizontal intermediate positions) may be used. For example, the sub-scanning-directional calibration amount processing subsection 622 operates to: detect, as the first horizontal edges, a plurality of edges in the calibration figure FGv based on the image of the sub-scanning-directional relative position calibration chart PvCT acquired by the imaging unit 5; detect, as the second horizontal edges, a plurality of edges in the calibration figure FGv based on the color measurement result of the sub-scanning-directional relative position calibration chart PvCT obtained by the color measuring unit 3; and derive the second information about the relative position relationship between the color measuring unit 3 and the imaging unit 5, based on first intermediate positions between adjacent ones of the detected first horizontal edges and second intermediate positions between adjacent ones of the detected first horizontal edges. For example, as depicted in FIG. 16, each of the first and second intermediate positions is derived as an intermediate position (○ or Δ) having a coordinate (x) at which each edge in a corresponding one of the horizontal edge graph data horCIS (m) and the color measurement result horColor (m) of the sub-scanning-directional relative position calibration chart PvCT obtained by the color measuring unit 3 cuts across a preset given threshold (sixth threshold, e.g., one-half of a peak value) th6.

In one or more embodiments, the second information about the relative position relationship between the color measuring unit 3 and the imaging unit 5 in the sub scanning direction is derived during the course of moving the sub-scanning-directional relative position calibration chart PvCT along the sub scanning direction in the forward feeding mode. Alternatively, it may be additionally derived during the course of moving the sub-scanning-directional relative position calibration chart PvCT along the sub scanning direction in the backward feeding mode. By deriving the second information about the relative position relationship in the both directions, it becomes possible to perform calibration even in a situation where an amount of deformation in a sheet being conveyed by the sub-scanning-directionally moving unit 2 varies depending on sheet conveyance direction, and thus a sheet feeding pulse number required for conveying the sheet between the position of the color measuring unit 3 and the position of the imaging unit 5 varies depending on sheet conveyance direction.

In one or more embodiments, the main-scanning-directional calibration amount processing substep depicted in FIG. 5 is executed first, and the sub-scanning-directional calibration amount processing substep depicted in FIG. 11 is subsequently executed. Alternatively, the sub-scanning-directional calibration amount processing substep depicted in FIG. 11 may be executed first, and the main-scanning-directional calibration amount processing substep depicted in FIG. 5 may be subsequently executed. In one or more embodiments, in the calibration amount processing step, both of the main-scanning-directional calibration amount processing substep depicted in FIG. 5 and the sub-scanning-directional calibration amount processing substep depicted in FIG. 11 are executed. However, in the case where a design value is enough for one of the first and second information about the relative position relationship, only one substep for deriving the other information may be executed. For example, only the main-scanning-directional calibration amount processing substep depicted in FIG. 5 may be executed, and a design value may be used for the second information, without executing the sub-scanning-directional calibration amount processing substep depicted in FIG. 11.

Figure 17:
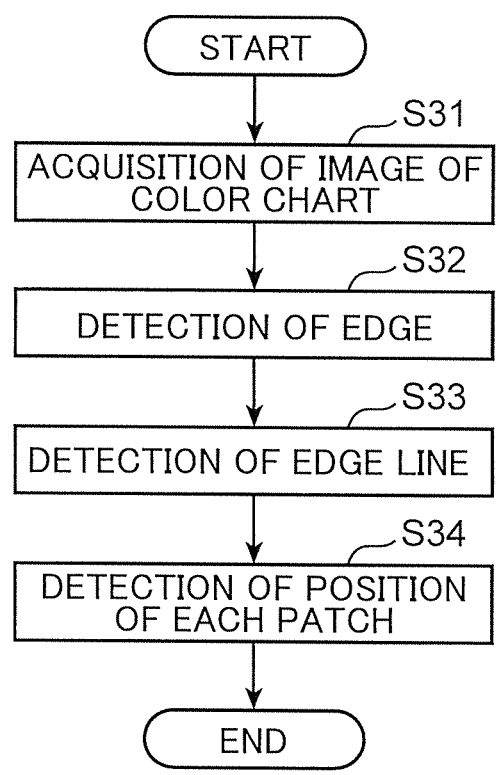
FIG. 17 is a flowchart depicting an operation of the color measurement device in accordance with one or more embodiments, in case of deriving a position of each of a plurality of patches of a color chart.
Figure 18:
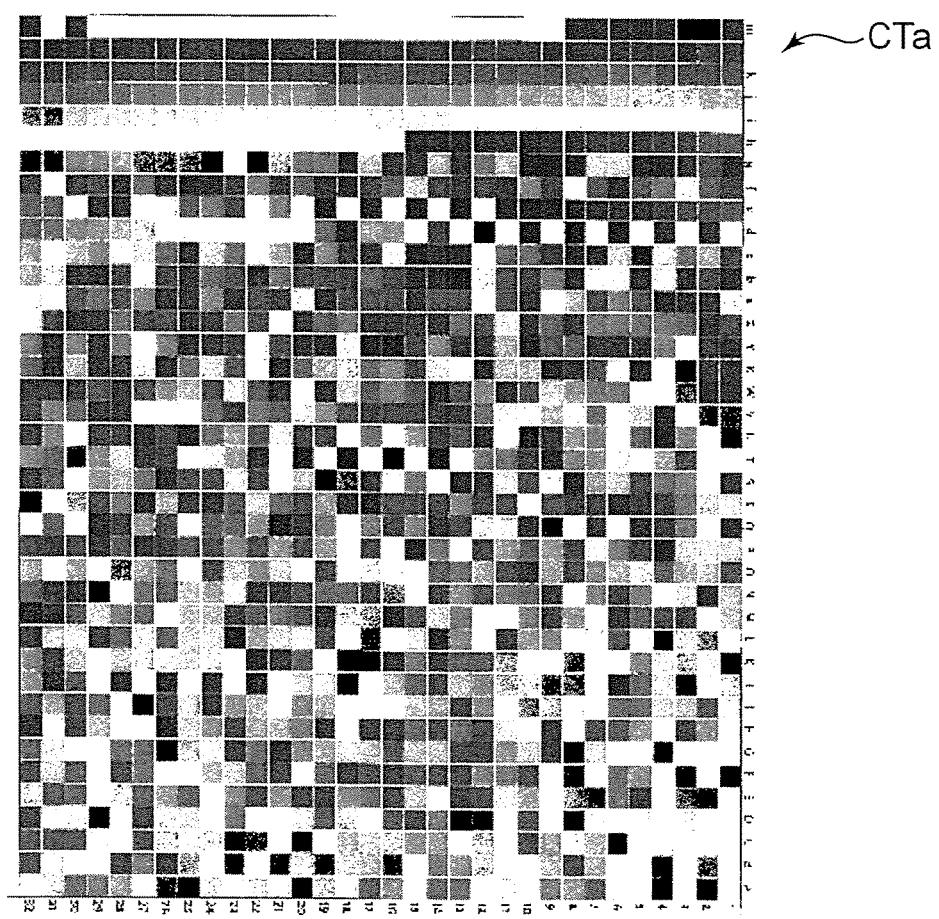
FIG. 18 is a diagram depicting, as one example, an image of the color chart.
Figure 19:
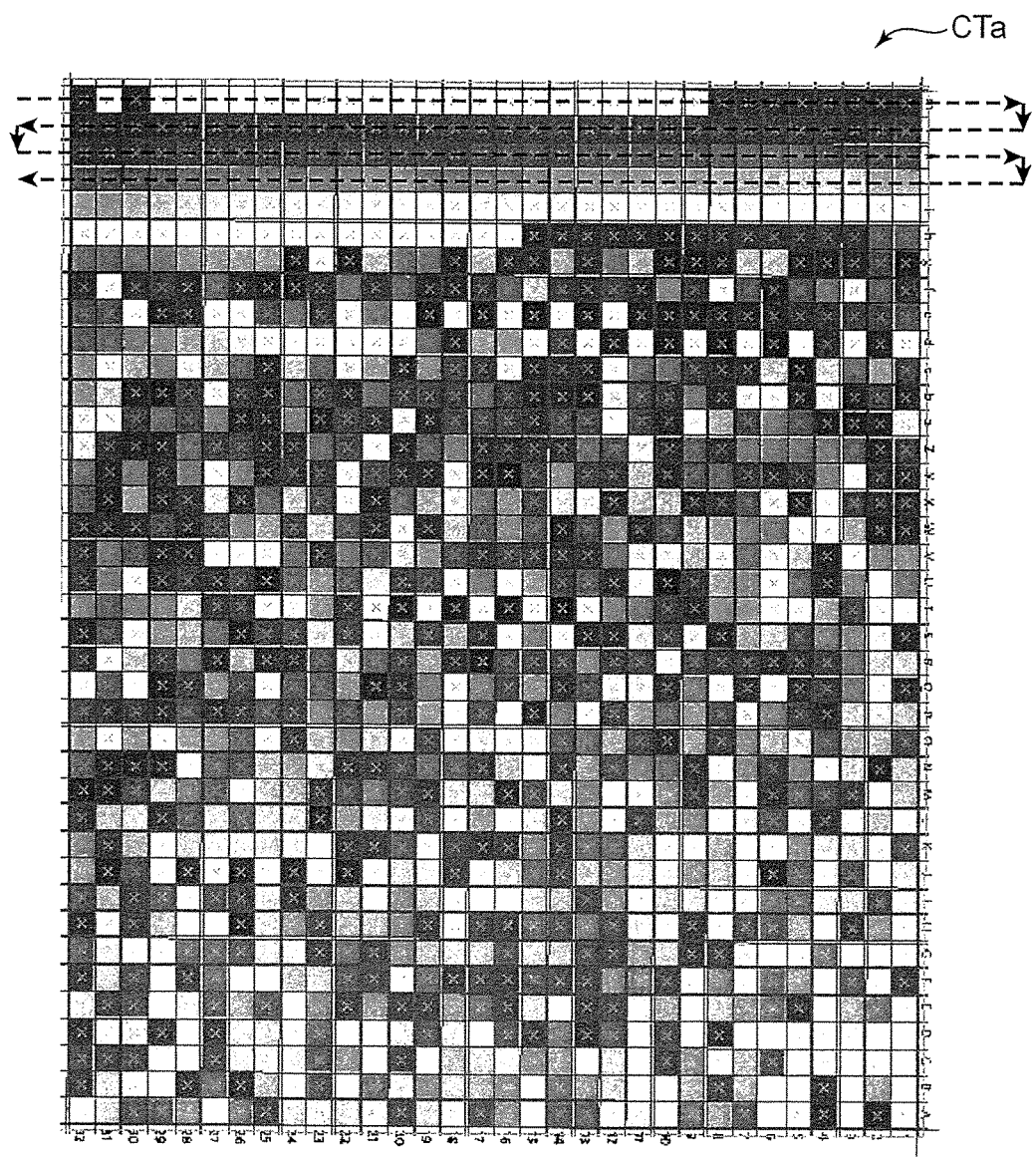
FIG. 19 is a diagram depicting an actual measured position (x) of each patch of the color chart in FIG. 18.
Figure 20:
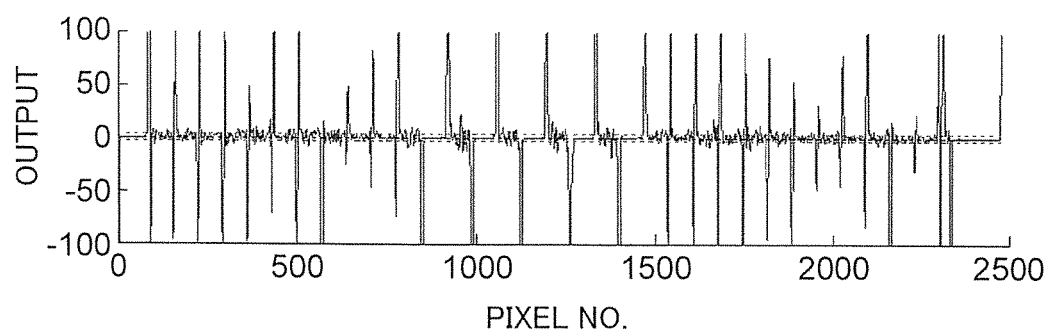
FIG. 20 is a chart depicting one example of a result of processing for the color chart in FIG. 18, wherein an image at a certain y-directional position was subjected to processing using a difference filter having a number N of difference interval points along a horizontal direction.
Figure 21:
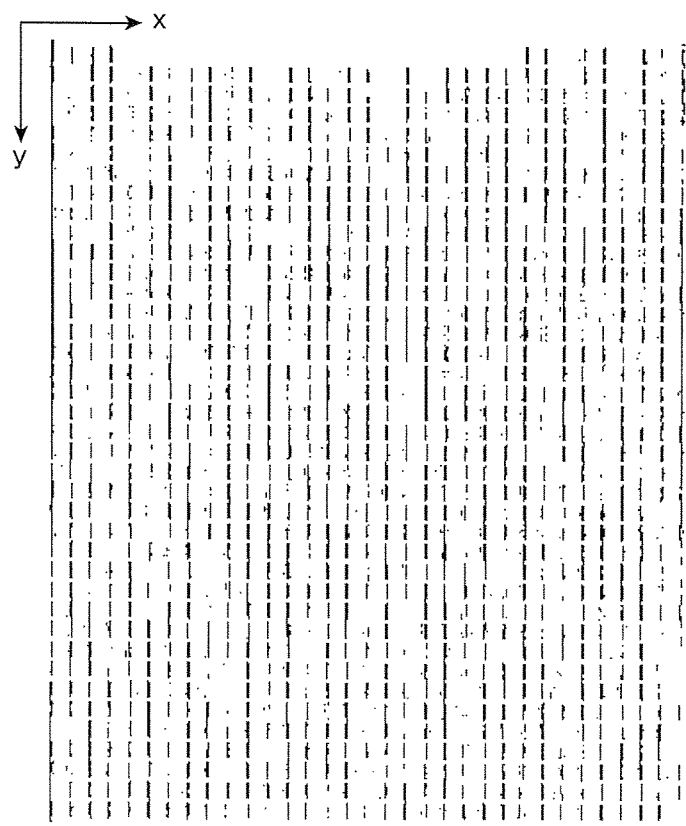
FIG. 21 is a diagram depicting, as one example, a binarized vertical edge image of the color chart in FIG. 18.
Figure 22:
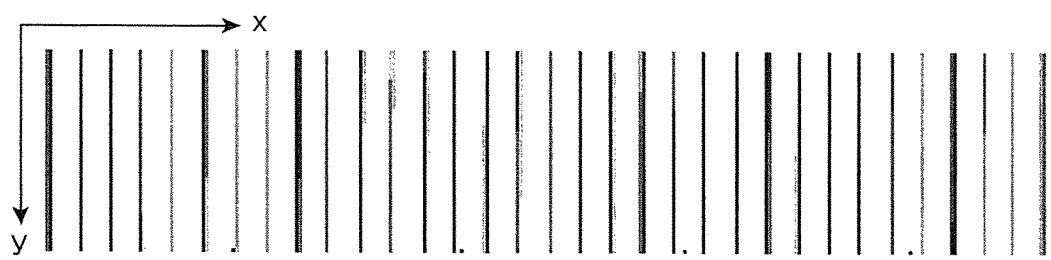
FIG. 22 is a diagram depicting, as one example, a part of the vertical edge line image of the color chart in FIG. 18.
Figure 23:
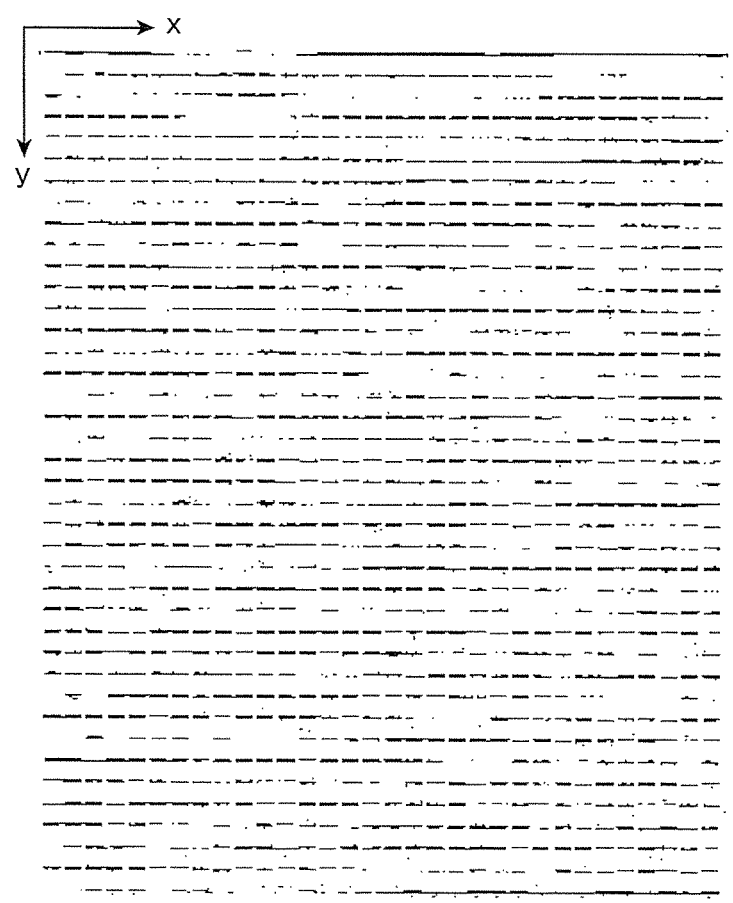
FIG. 23 is a diagram depicting, as one example, a binarized horizontal edge image of the color chart in FIG. 18.
Figure 24:
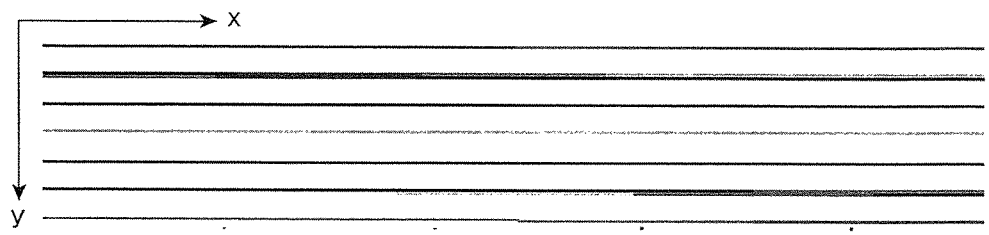
FIG. 24 is a diagram depicting, as one example, a part of the horizontal edge line image of the color chart in FIG. 18.
Figure 25:
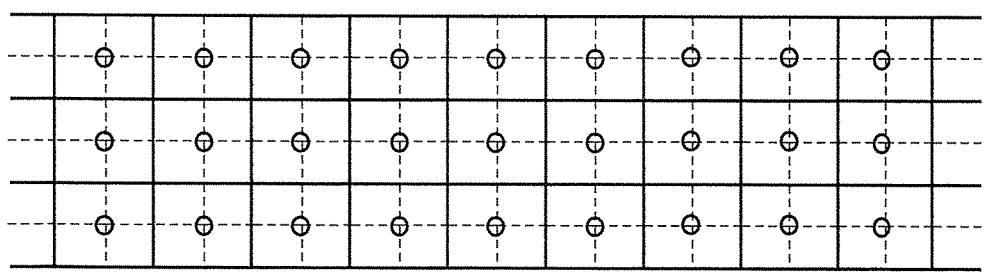
FIG. 25 is a diagram depicting, as one example, a part of positions of the patches derived from the vertical edge line image and the horizontal edge line image of the color chart in FIG. 18.

Next, the position processing step will be more specifically described. FIG. 17 is a flowchart depicting an operation of the color measurement device in accordance with one or more embodiments, in case of deriving a position of each of a plurality of patches of a color chart. FIG. 18 is a diagram depicting, as one example, an image of the color chart. FIG. 19 is a diagram depicting an actual measured position (x) of each patch of the color chart in FIG. 18. FIG. 20 is a chart depicting one example of a result of processing for the color chart in FIG. 18, wherein an image at a certain y-directional position was subjected to processing using a difference filter having a number N of difference interval points along a horizontal direction. In FIG. 20, the horizontal axis represents a pixel number (i.e., a position in the horizontal direction x) in the imaging unit 5, and the vertical axis represents a difference value. FIG. 21 is a diagram depicting, as one example, a binarized vertical edge image of the color chart in FIG. 18. FIG. 22 is a diagram depicting, as one example, a part of the vertical edge line image of the color chart in FIG. 18. FIG. 23 is a diagram depicting, as one example, a binarized horizontal edge image of the color chart in FIG. 18. FIG. 24 is a diagram depicting, as one example, a part of the horizontal edge line image of the color chart in FIG. 18. FIG. 25 is a diagram depicting, as one example, a part of positions of the patches derived from the vertical edge line image and the horizontal edge line image of the color chart in FIG. 18. In FIG. 25, the solid line and the broken line denote, respectively, a vertical edge line or a horizontal edge line, and an intermediate line between adjacent vertical edge lines or an intermediate line between adjacent horizontal edge lines, and ○ denotes an actually measured position of each patch (actual measured patch position).

In the position processing step depicted in FIG. 17, when the color chart CT is placed in the sheet feeding unit 1 and then start of color measurement is instructed through the input unit 7, the color measurement device CM first acquires an entire image of the color chart CT, for example, in the forward feeding mode (S31). More specifically, the position processing section 63 of the control processing unit 6 operates to acquire the image of the color chart CT by causing the sub-scanning-directionally moving unit 2 to convey the color chart CT from one edge to the other edge of a predetermined patch region of the color chart CT in the sub scanning direction (y-direction) in the forward feeding mode, using a heretofore-known commonplace means, and causing the imaging unit 5 to image, in synchronization with this sub-scanning-directional conveyance, the color chart CT with respect to each line along the main scanning direction (x-direction). The patch region means a region of the color chart CT in which the plurality of patches are located. For example, an image of the color chart CTa depicted in FIG. 18 is acquired, wherein the image is constructed such that a plurality of quadrangular-shaped patches having various colors are arranged (in two directions: x-direction; and y-direction orthogonal to each other) in a two-dimensional array configuration.

Subsequently, the color measurement device CM detects and binarizes an edge component of the image of the color chart CT acquired in the processing S31, using a given edge filter, to thereby generate image data of a binarized edge image (binarized edge image data) (S32). More specifically, the position processing section 63 operates in the following manner to, based on the entire image of the color chart CT, generate image data of an binarized vertical edge image (binarized vertical edge image data) obtained by expressing, as binary values, an edge component along the vertical direction (y-direction), and image data of an binarized horizontal edge image (binarized horizontal edge image data) obtained by expressing, as binary values, an edge component along the horizontal direction (x-direction).

In the case of deriving a vertical edge component as an edge component along the sub scanning direction (vertical direction, y-direction), it is possible to use, as an example of the edge filter, a difference filter expressed in the following formula (8) which has a number N of difference interval points and is capable of providing a difference output in the main scanning direction (horizontal direction, x-direction).

$$DiffFilterX = [\,1 \underbrace{\;0\;\ldots\;0\;}_{(N-1)_{POINT}} -1\,] \qquad (8)$$

An inward region of each patch has the same color and almost no change in color density. On the other hand, a boundary (edge) between adjacent ones of the patches has a large change in color density. Thus, the inward region of each patch has a relatively small difference value, and the patch boundary (edge) has a relatively large difference value. FIG. 20 depicts one example of a result of processing for the color chart in FIG. 18, wherein an image at a certain y-directional position was subjected to processing using a difference filter having a number N of difference interval points along the x-direction.

Then, an absolute value of the processing result after the edge filter processing is derived and compared with a preset threshold (seventh threshold) th7. As a result of this comparison, when the absolute is equal to or greater than the seventh threshold th7, it is set to 1. On the other hand, when the absolute is less than the seventh threshold th7, it is set to 0. In this way, respective pixel values of a plurality of pixels are binarized to generate binarized vertical edge image data. It is to be understood that, after the binarization, noise may further be removed to generate the binarized vertical edge image data.

On the other hand, in the case of deriving a horizontal edge component as an edge component along the main scanning direction (horizontal direction, x-direction), it is possible to use, as an example of the edge filter, a difference filter expressed in the following formula (9) which has a number N of difference interval points and is capable of providing a difference output in the sub scanning direction (vertical direction, y-direction), instead of the above formula (8).

$$DiffFilterY = \left.\begin{bmatrix} 1 \\ 0 \\ \vdots \\ 0 \\ -1 \end{bmatrix}\right\} (N-1)_{POINT} \quad (9)$$

Then, the difference output is processed in the same manner as that in the generation of the binarized vertical edge image data, to generate binarized horizontal edge image data.

For example, an edge component of the image of the color chart CTa depicted in FIG. 18 may be extracted by using the edge filter expressed by the formula (8), and then binarized. In this case, it is possible to generate binarized vertical edge image data pictVer0 (x, y) as image data of a binarized vertical edge image depicted in FIG. 21. Further, an edge component of the image of the color chart CTa depicted in FIG. 18 may be extracted by using the edge filter expressed by the formula (9), and then binarized. In this case, it is possible to generate binarized horizontal edge image data pictHor0 (x, y) as image data of a binarized horizontal edge image depicted in FIG. 23.

Subsequently, the color measurement device CM subjects the binarized edge image data about the color chart CT, generated in the processing S32, to so-called straight line detection based on a Hough transform, to thereby detect edge lines (S33). More specifically, the position processing section 63 operates to Hough-transform each of the binarized vertical edge image data and the binarized horizontal edge image data about the color chart CT, to thereby detect vertical edge lines and horizontal edge lines.

For example, when the binarized vertical edge image data pictVer0 (x, y), as image data of the binarized vertical edge image of the color chart CTa, depicted in FIG. 21, is Hough-transformed, vertical edge lines as depicted, for example, in FIG. 22, are detected. Further, when the binarized horizontal edge image data pictHor0 (x, y), as image data of the binarized horizontal edge image of the color chart CT, depicted in FIG. 23, is Hough-transformed, horizontal edge lines as depicted, for example, in FIG. 24, is detected.

Subsequently, the color measurement device CM derives a position (x, y) of each patch based on the edge lines generated in the processing S33 (S34), and the position processing step is terminated. More specifically, first of all, the position processing section 63 operates to derive vertical intermediate lines which are intermediate lines between adjacent ones of the plurality of vertical edge lines. Then, the position processing section 63 operates to derive horizontal intermediate lines which are intermediate lines between adjacent ones of the horizontal edge lines. Then, the position processing section 63 operates to derive respective intersections of the derived vertical intermediate lines and the derived horizontal intermediate lines, as respective positions (x, y) of the patches.

For example, when the vertical intermediate lines and the horizontal intermediate lines are derived, respectively, based on the vertical edge lines and the horizontal edge lines derived with respect to the color chart CTa depicted in FIG. 18, vertical intermediate lines and horizontal intermediate lines indicated by the broken lines in FIG. 25 are derived, and respective intersections of the vertical intermediate lines and the horizontal intermediate lines are derived as respective positions (x, y) of the patches, as indicated by the mark "o" in FIG. 25. Respective positions of the patches in the entire color chart CTa depicted in FIG. 18 are indicated by the mark "x" in FIG. 19.

By executing the position processing step in the above manner, respective positions of the patches in the color chart CT are derived.

Subsequently, in the color measurement processing step, the color measurement processing section 64 of the control processing unit 6 operates to cause the color measuring unit 3 to measure the color of each of the plurality of patches in the color chart CT, in a state in which the position of the color measuring unit 3 is adjusted to become coincident with the position of each of the patches by causing the sub-scanning-directionally moving unit 2 to convey the color chart CT and causing the main-scanning-directionally moving unit 4 to move the color measuring unit 3, while correcting, according to the relative position relationship-related information derived in the calibration amount processing step in the above manner, the position of each of the plurality of patches derived in the position processing step in the above manner. More specifically, as regards the main scanning direction, the color measurement processing section 64 operates to move the color measuring unit 3 to the position of each patch according to the first drive pulse having a pulse number converted from an x-coordinate of the position of each patch by the formula (6). As regards the sub scanning direction, the color measurement processing section 64 operates to move the color chart CT to the position of each patch according to the second drive pulse having a pulse number converted from a y-coordinate of the position of each patch by the formula (7).

Then, the color measurement processing section 64 operates to measure respective colors of the patches, and, after measuring a color of a last one of the patches, the control section 61 of the control processing unit 6 operates to output the measured colors of the patches to the output unit 8 to complete the processing. As needed, the control section 61 of the control processing unit 6 may operate to the measured colors of the patches to the IF unit 9.

As mentioned above, in the color measurement device CM according to the above embodiments and the color measurement method used therewith, the information about the relative position relationship between the color measuring unit 3 and the imaging unit 5 (relative position relationship-related information) is actually measured based on the calibration feature in the image of the relative position calibration chart PCT acquired by the imaging unit 5, and the calibration feature in the color measurement result of the relative position calibration chart PCT obtained by the color measuring unit 3. Thus, in the color measurement device CM according to the above embodiments and the color measurement method used therewith, the color measuring unit 3 and the imaging unit 5 are positionally associated with each other, using the actually measured relative position relationship-related information, so that it becomes possible to more properly adjust the position of the color measuring unit 3 to become coincident with the position of each patch based on the image of the color chart CT obtained by the imaging unit 5. Therefore, the color measurement device CM according to the above embodiments and the color measurement method used therewith make it possible to actually measure the information about the relative position relationship between the color measuring unit 3 and the imaging unit 5 to thereby measure a color of each patch at a more proper position.

Figure 26:
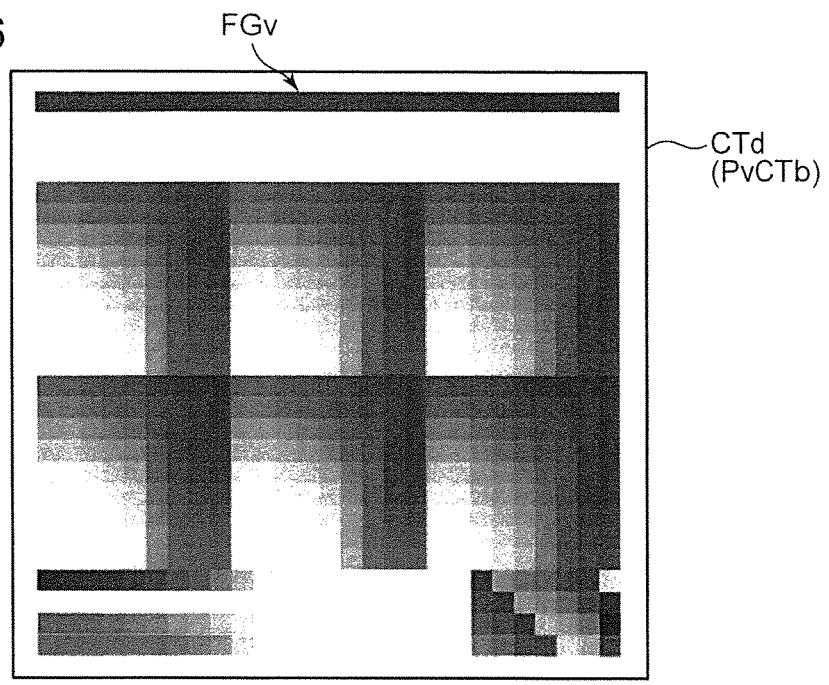
FIG. 26 is a diagram depicting a color chart including a calibration figure.

In the above embodiments, the relative position calibration chart PCT is prepared separately from the color chart CTa. Alternatively, as depicted in FIG. 26, a color chart CTb may include a calibration figure FG to have both functions of a color chart CT and a relative position calibration chart PCT. FIG. 26 depicts one example where the calibration figure FG is a horizontal bar FGv. Alternatively, the calibration figure FG may be a vertical bar FGh as in the above embodiments. Alternatively, the calibration figure FG may be a combination of a horizontal bar FGv and a vertical bar FGh, or the like. In the case where a sheet material of the color chart CT is different from a sheet material of the relative position calibration chart PCT, a slip amount of the color chart CT during conveyance thereof by the sub-scanning-directionally moving unit (sheet conveyance unit) 2 can be different from a slip amount of the relative position calibration chart PCT during conveyance thereof by the sub-scanning-directionally moving unit 2. Thus, the relative position calibration chart PCT is made of the same sheet material as that of the color chart CT. On the other hand, when it is made of a sheet material different from that of the color chart CT, it is necessary to perform a correction for coping with the difference in slip amount. For example, a slip amount depending on sheet material is preliminarily measured, and a correction value for correcting the relative position relationship-related information, with respect to a difference in slip amount caused by a difference in sheet material. Then, for example, a user may selectively designate one of the correction values, depending on a difference between respective sheet materials of the color chart CT and the relative position calibration chart PCT, to correct the relative position relationship-related information by the designated correction value. When the color measurement device CM uses the color chart CTb including the calibration figure FGh, it is not necessary to take into account a difference in slip amount caused by a difference in sheet material. In this case, the color measurement device CM becomes free from the need for preparing the relative position calibration chart PCT.

Figure 27:
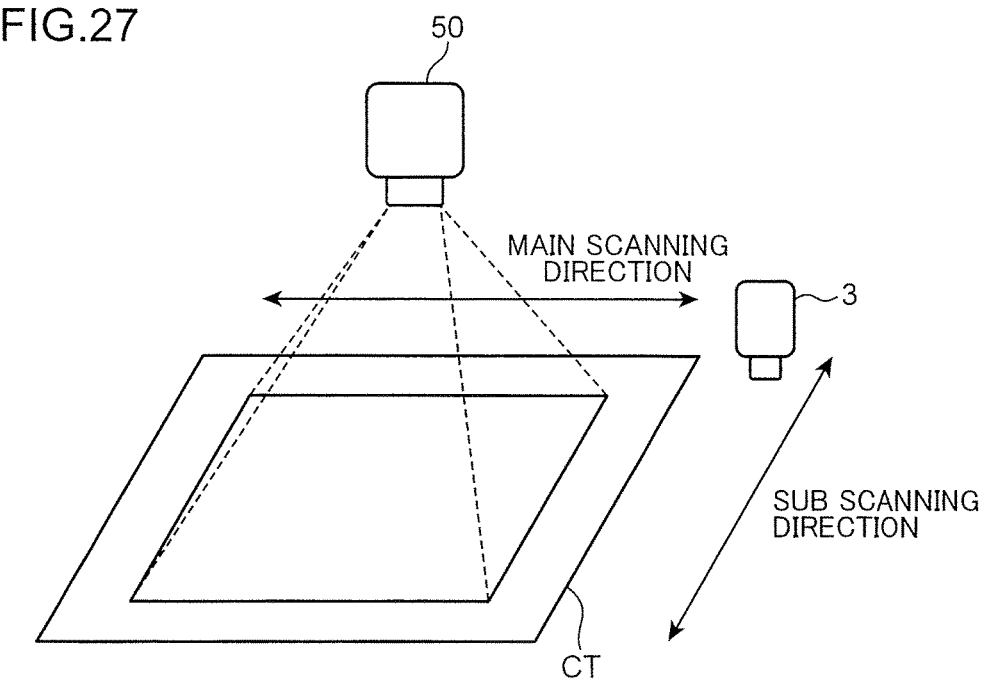
FIG. 27 is a diagram depicting a schematic configuration of a color measurement device in accordance with one or more embodiments.

In the above embodiments, the color measurement device CM is equipped with the imaging unit 5 constructed such that it includes a line sensor having a plurality of photoelectric conversion elements arranged along one direction. Alternatively, it may be equipped with an imaging unit 50 constructed such that it includes an area sensor (two-dimensional image sensor) having a plurality of photoelectric conversion elements two-dimensionally arranged along mutually linear independent two directions (e.g., mutually orthogonal two directions), instead of the imaging unit 5. FIG. 27 is a diagram depicting a schematic configuration of a color measurement device according to one or more embodiments, wherein the imaging unit comprises an area sensor. In the color measurement device using the line sensor, it is necessary to convey the color chart CT or the relative position calibration chart PCT in a direction (sub scanning direction) orthogonal to a longitudinal direction of the line sensor (main scanning direction) so as to acquire the entire image of the chart, as mentioned above. Thus, in the color measurement device using the line sensor, slip of the chart is likely to occur during the conveyance, and therefore it is necessary to take into account this slip when the position of each patch is collected by the relative position relationship-related information. On the other hand, the imaging unit 50 constructed such that it comprises an area sensor as depicted in FIG. 27 is capable of imaging the entire image of the chart without conveying the chart as mentioned above. Thus, the color measurement device CM using such an area sensor becomes free from the need for taking into account slip of the relative position calibration chart PCT. In this case, the color measurement device CM may be constructed such that the color measurement unit 3 can be two-dimensionally scanned with respect to the color chart CT. For example, the color measurement device CM may be constructed such that it includes a moving unit capable of moving the color measuring unit 3 in the main scanning direction (x-direction) and the sub scanning direction (y-direction), or may be constructed such that it includes a stage capable of allowing the color chart CT to be placed thereon and movable in the main scanning direction (x-direction) and the sub scanning direction (y-direction). Alternatively, the color measuring unit 3 may be constructed to be movable in one of the main scanning direction and the sub scanning direction, and the stage may be constructed to be movable in the other direction.

In this case, the relative position calibration chart PCT is marked with a sub-scanning-directionally long quadrangle (vertical bar-like figure) FGh serving as the calibration figure FGh for calibration in the main scanning direction, and a main-scanning-directionally long quadrangle (horizontal bar-like figure) FGv serving as the calibration figure FGv for calibration in the sub scanning direction. Then, when the color measuring unit 3 is moved, in the calibration amount processing step, $I_{home}$ and $\Delta X_{pulse}/\Delta X_{image}$ are derived from edge positions based on the relative position calibration chart PCT acquired by the imaging unit 50 and edge positions based on the color measurement result of the relative position calibration chart PCT obtained by the movement of the color measuring unit 3, in the same manner as described above. The $\Delta X_{image}$ means a pixel size (size of a pixel) of the area sensor. Similarly, when the stage is moved, in the calibration amount processing step, the "b" and the "a" in the formula (7) are derived from edge positions based on the relative position calibration chart PCT acquired by the imaging unit 50 and edge positions based on the color measurement result of the relative position calibration chart PCT obtained by the movement of the stage, in the same manner as described above.

In the above embodiments, the color measurement device CM integrally includes the sheet feeding unit 1, the sub-scanning-directionally moving unit (sheet conveyance unit) 2, the color measuring unit 3, the main-scanning-directionally moving unit 4, the imaging unit 5, the control processing unit 6, the input unit 7, the output unit 8, the IF unit 9 and the storage unit 10. However, the present invention is not limited thereto. The color measurement device CM may integrally include at least the color measuring unit 3, the main-scanning-directionally moving unit 4, the sub-scanning-directionally moving unit (sheet conveyance unit) 2, and the imaging unit 5, as a color measuring assembly, wherein the color measuring assembly may further include a storage unit for storing therein the relative position relationship-related information derived by the calibration amount processing section 62. The actually measured relative position relationship-related information is information unique to a set of the color measuring unit 3 and the imaging unit 5. In this type of color measurement device CM, the color measuring assembly comprising the color measuring unit 3 and the imaging unit 5 further comprises the storage unit for storing therein the relative position relationship-related information, so that it becomes possible to pair the color measuring unit 3 and the imaging unit 5 with the actually measured relative position relationship-related information thereof. Thus, this type of color measurement device CM is less likely to erroneously use relative position relationship-related information of a different set of a color measuring unit and an imaging unit.

This specification discloses various techniques as mentioned above. Among them, major techniques will be outlined as follows.

According to one aspect, there is provided a color measurement device which includes: a color measuring unit which measures a color; a moving unit which moves the color measuring unit along a given first direction; a conveyance unit which conveys a given sheet along a second direction orthogonal to the first direction; an imaging unit which acquires an image; a calibration amount processing unit which causes the imaging unit to acquire an image of a relative position calibration chart marked with a calibration figure having a given calibration feature whose position is detectable along at least one of the first and second directions; causes the color measuring unit to subject the relative position calibration chart to color measurement; and derives information about a relative position relationship between the color measuring unit and the imaging unit, based on the given calibration feature in the image of the relative position calibration chart acquired by the imaging unit, and the given calibration feature in a result of the color measurement of the relative position calibration chart obtained by the color measuring unit; a position processing unit which causes the imaging unit to acquire an image of a color chart having a plurality of patches each of which is a region of a given color, and derives a position of each of the plurality of patches based on the acquired image of the color chart; and a color measurement processing unit which causes the color measuring unit to measure the color of each of the plurality of patches, while correcting, according to the information derived by the calibration amount processing section, the position of each of the plurality of patches which has been derived by the position processing section and is to be subjected to the color measurement by the color measuring unit.

In the color measurement device having the above feature, the information about the relative position relationship between the color measuring unit and the imaging unit (relative position relationship-related information) is actually measured based on the calibration feature in the image of the relative position calibration chart acquired by the imaging unit, and the calibration feature in the color measurement result of the relative position calibration chart obtained by the color measuring unit. Thus, in the color measurement device having the above feature, the color measuring unit and the imaging unit are positionally associated with each other, using the actually measured relative position relationship-related information, so that it becomes possible to more properly adjust the position of the color measuring unit to become coincident with the position of each patch based on the image of the color chart obtained by the imaging unit. Therefore, the color measurement device having the above feature can actually measure the information about the relative position relationship between the imaging unit and the color measuring unit, to thereby measure a color of each patch at a more proper position.

In one or more embodiments, the calibration figure of the relative position calibration chart is a quadrangular shape which is long in one direction.

In this color measurement device, the relative position calibration chart can be easily prepared simply by marking a one-directionally long quadrangle as the calibration figure.

In one or more embodiments, the given calibration feature is an edge of the calibration figure.

This makes it possible to provide a color measurement device utilizing an edge of the calibration figure as the detectable feature.

In one or more embodiments, the given calibration feature is an intermediate point of an edge of the calibration figure.

This makes it possible to provide a color measurement device capable of deriving the relative position relationship-related information based on an intermediate point (intermediate position) of the edge.

In one or more embodiments, the color chart includes the calibration figure.

In the case where a sheet material of the color chart is different from a sheet material of the relative position calibration chart, a slip amount of the color chart during conveyance thereof by the moving unit can be different from a slip amount of the relative position calibration chart during conveyance thereof by the moving unit. Thus, the relative position calibration chart is made of the same sheet material as that of the color chart. On the other hand, when it is made of a sheet material different from that of the color chart, it is necessary to perfoun a correction for coping with the difference in slip amount. In the color measurement device having the above feature, the color chart includes the calibration figure, so that it is not necessary to take into account a difference in slip amount caused by a difference in sheet material. In addition, this color measurement device becomes free from the need for preparing the relative position calibration chart, separately.

In one or more embodiments, the imaging unit includes a line sensor.

In an area sensor comprising an imaging optical system, distortion can occur in a peripheral region of an image due to aberration of the imaging optical system. In the color measurement device having the above feature, the imaging unit comprises the line sensor, so that it is not necessary to take into account distortion in a peripheral region of an image which is likely to occur due to the imaging optical system.

In one or more embodiments, the imaging unit includes an area sensor.

In a color measurement device using the line sensor, it is necessary to convey a chart in a direction orthogonal to a longitudinal direction of the line sensor so as to acquire the entire image of the chart. Thus, in the color measurement device using the line sensor, slip of the chart is likely to occur during the conveyance, and therefore it is necessary to take into account this slip when the position of each patch is collected by the relative position relationship-related information. In the color measurement device having the above feature, the imaging unit comprises an area sensor, so that it becomes possible to image the entire image of the chart without conveying the chart. Thus, the color measurement device using an area sensor becomes free from the need for taking into account slip of the relative position calibration chart.

In one or more embodiments, at least the color measuring unit, the moving unit, the conveyance unit and the imaging unit are integrally constructed as a color measuring assembly, wherein the color measuring assembly further includes a storage unit which stores therein the relative position relationship-related information derived by the calibration amount processing section.

The actually measured relative position relationship-related information is information unique to a set of the color measuring unit and the imaging unit. In the color measurement device having the above feature, the color measuring assembly comprising the color measuring unit and the imaging unit further comprises the storage unit for storing therein the relative position relationship-related information, so that it becomes possible to pair the color measuring unit and the imaging unit with the actually measured relative position relationship-related information thereof. Thus, this color measurement device is less likely to erroneously use relative position relationship-related information of a different set of a color measuring unit and an imaging unit.

According to another aspect, there is provided a color measurement method for use in a color measurement device, wherein the color measurement device includes: a color measuring unit which measures a color; a moving unit which moves the color measuring unit along a given first direction; a conveyance unit which conveys a given sheet along a second direction orthogonal to the first direction; an imaging unit which acquires an image; and a control processing unit which controls the color measuring unit, the moving unit, the a conveyance unit and the imaging unit. The color measurement method includes: a calibration amount processing step of: causing the imaging unit to acquire an image of a relative position calibration chart marked with a calibration figure having a given calibration feature whose position is detectable along at least one of the first and second directions; causing the color measuring unit to subject the relative position calibration chart to color measurement; and deriving information about a relative position relationship between the color measuring unit and the imaging unit, based on the given calibration feature in the image of the relative position calibration chart acquired by the imaging unit, and the given calibration feature in a result of the color measurement of the relative position calibration chart obtained by the color measuring unit; a position processing step of causing the imaging unit to acquire an image of a color chart having a plurality of patches each of which is a region of a given color, and deriving a position of each of the plurality of patches based on the acquired image of the color chart; and a color measurement processing step of causing the color measuring unit to measure the color of each of the plurality of patches, while correcting, according to the relative position relationship-related information derived in the calibration amount processing step, the position of each of the plurality of patches which has been derived in the position processing step and is to be subjected to the color measurement by the color measuring unit.

In the color measurement method having the above feature, the information about the relative position relationship between the color measuring unit and the imaging unit (relative position relationship-related information) is actually measured based on the calibration feature in the image of the relative position calibration chart acquired by the imaging unit, and the calibration feature in the color measurement result of the relative position calibration chart obtained by the color measuring unit. Thus, in the color measurement method having the above feature, the color measuring unit and the imaging unit are positionally associated with each other, using the actually measured relative position relationship-related information, so that it becomes possible to more properly adjust the position of the color measuring unit to become coincident with the position of each patch based on the image of the color chart obtained by the imaging unit. Therefore, the color measurement device having the above feature makes it possible to actually measure the information about the relative position relationship between the imaging unit and the color measuring unit, to thereby measure a color of each patch at a more proper position.

This application is based on Japanese Patent Application Serial No. 2014-96099 filed in Japan Patent Office on May 7, 2014, the contents of which are hereby incorporated by reference.

Although the present invention has been described appropriately and fully by way of the embodiments as above with reference to the drawings in order to express the present invention, it should be appreciated that anyone skilled in the art can readily change and/or modify the embodiments described above. It is therefore understood that any changed embodiments or modified embodiments implemented by anyone skilled in the art is encompassed within the scope of the appended claims unless the changed embodiment or the modified embodiment is of a level that deviates from the scope of the appended claims.

Further, although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

Embodiments of the present invention can provide a color measurement device and a color measurement method.

The invention claimed is:

1. A color measurement device comprising:
a color measuring sensor that:
  performs color measurements; and
  moves along a first direction;
a conveyance roller that conveys a given sheet along a second direction that is orthogonal to the first direction;
an imaging sensor that acquires images;
a calibration amount processing circuit that:
  causes the imaging sensor to acquire an image of a relative position calibration chart,
    wherein the relative position calibration chart comprises a calibration figure having a given calibration feature, and
    wherein a position of the given calibration feature is detectable along at least one of the first and second directions;
  causes the color measuring sensor to perform a color measurement of the relative position calibration chart; and
  derives information about a relative position relationship between the color measuring sensor and the imaging sensor based on:
    the given calibration feature in the image of the relative position calibration chart, and
    the given calibration feature in the color measurement of the relative position calibration chart;
a position processing circuit that:
  causes the imaging sensor to acquire an image of a color chart having a plurality of patches, wherein each of the plurality of patches comprises a region of a given color; and
  derives a position of each patch of the plurality of patches based on the image of the color chart; and
a color measurement processing circuit that:
  causes the color measuring sensor to measure the color of each of the plurality of patches, while correcting the position of each of the plurality of patches, based on the information about the relative position relationship.

2. The color measurement device as recited in claim 1, wherein the calibration figure of the relative position calibration chart has a quadrangular shape having a length in a first direction that is greater than a length in a second direction.

3. The color measurement device as recited in claim 1, wherein the given calibration feature is an edge of the calibration figure.

4. The color measurement device as recited in claim 1, wherein the given calibration feature is an intermediate point of an edge of the calibration figure.

5. The color measurement device as recited in claim 1, wherein the color chart comprises the calibration figure.

6. The color measurement device as recited in claim 1, wherein the imaging sensor comprises a line sensor.

7. The color measurement device as recited in claim 1, wherein the imaging sensor comprises an area sensor.

8. The color measurement device as recited in claim 1, wherein
at least the color measuring sensor, the conveyance roller and the imaging sensor are integrally constructed as a color measuring assembly, and
wherein the color measuring assembly further comprises a storage capable of storing therein the information about the relative position relationship.

9. A color measurement method for use in a color measurement device that comprises: a color measuring sensor that moves along a given first direction; a conveyance roller that conveys a given sheet along a second direction that is orthogonal to the first direction; an imaging sensor; and a control processing circuit that controls the color measuring sensor, the conveyance roller, and the imaging sensor, the color measurement method comprising:
acquiring, with the imaging sensor, an image of a relative position calibration chart marked with a calibration figure having a given calibration feature whose position is detectable along at least one of the first and second directions;
performing, with the color measuring sensor, a color measurement on the relative position calibration chart; and
deriving, with the control processing circuit, information about a relative position relationship between the color measuring sensor and the imaging sensor based on:
the given calibration feature in the image of the relative position calibration chart, and
the given calibration feature in the color measurement of the relative position calibration chart;
acquiring, with the imaging sensor, an image of a color chart having a plurality of patches, wherein each of the plurality of patches comprises a region of a given color; and
deriving, with the control processing circuit, a position of each of the plurality of patches based on the image of the color chart; and
measuring, with the color measuring sensor, the color of each of the plurality of patches, while correcting the position of each of the plurality of patches based on the information about the relative position relationship.

* * * * *